(12) United States Patent
Venkatraman et al.

(10) Patent No.: US 9,549,386 B2
(45) Date of Patent: Jan. 17, 2017

(54) TECHNIQUES FOR REDUCING SCANS FOR INDOOR POSITION DETERMINATION

(71) Applicant: QUALCOMM Incorporated, San Diego, CA (US)

(72) Inventors: Sai Pradeep Venkatraman, Santa Clara, CA (US); Subash Marri Sridhar, San Jose, CA (US); Douglas Neal Rowitch, Honolulu, HI (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/630,539

(22) Filed: Feb. 24, 2015

(65) Prior Publication Data

US 2016/0249315 A1    Aug. 25, 2016

(51) Int. Cl.
    *H04W 24/00* (2009.01)
    *H04W 64/00* (2009.01)
    *H04W 24/08* (2009.01)
    *G01S 5/02* (2010.01)

(52) U.S. Cl.
    CPC ............ *H04W 64/00* (2013.01); *G01S 5/0236* (2013.01); *H04W 24/08* (2013.01)

(58) Field of Classification Search
    CPC ............................. H04W 64/00; H04W 24/08
    USPC ...................................................... 455/456.1
    See application file for complete search history.

(56) References Cited

U.S. PATENT DOCUMENTS

| | | |
|---|---|---|
| 2008/0176583 A1 | 7/2008 | Brachet et al. |
| 2013/0293416 A1 | 11/2013 | Waters et al. |
| 2014/0011518 A1 | 1/2014 | Valaee et al. |
| 2014/0050210 A1 | 2/2014 | Waters et al. |
| 2014/0073345 A1 | 3/2014 | Chintalapudi et al. |
| 2014/0128100 A1 | 5/2014 | Sridhara et al. |
| 2014/0162589 A1* | 6/2014 | Gupta ................. H04W 64/003 455/404.2 |
| 2014/0179237 A1 | 6/2014 | Gao et al. |
| 2014/0179341 A1 | 6/2014 | Sydir et al. |
| 2014/0180627 A1 | 6/2014 | Naguib et al. |
| 2014/0235280 A1 | 8/2014 | Edge et al. |
| 2014/0274043 A1 | 9/2014 | Das et al. |
| 2014/0342755 A1 | 11/2014 | Youssef et al. |

OTHER PUBLICATIONS

Partial International Search Report—PCT/US2016/012956—ISA/EPO—May 12, 2016—7 pgs.
International Search Report and Written Opinion—PCT/US2016/012956—ISA/EPO—Aug. 31, 2016—20 pgs.

* cited by examiner

*Primary Examiner* — Tanmay Shah
(74) *Attorney, Agent, or Firm* — Hunter Clark PLLC

(57) ABSTRACT

Techniques for determining the position of a mobile device using almanac data are provided as are techniques for providing almanac data to the mobile device from a location server. The almanac data can be provided to the mobile device based on coarse location information provided by the mobile device. The almanac data can include information Media Access Control (MAC) addresses of one or more wireless access points and most recently used channel identification. The almanac data can also be binned by location by the location server and a subset of the almanac data can be selected to be provided to the mobile device based on the coarse location of the mobile device and on positioning effectiveness criteria associated with the wireless access points included in the almanac data.

16 Claims, 10 Drawing Sheets

Mobile Device Determining Position using Almanac Data

Mobile Device

Mobile Device

Wireless Access Point

Wireless Access Point

Location Server

Location Server

Mobile Device Determining Position using Almanac Data

Location Server Generating Almanac Data

Selecting Almanac Data for Mobile Device

Location Server Binning Almanac Data

TECHNIQUES FOR REDUCING SCANS FOR INDOOR POSITION DETERMINATION

BACKGROUND

Many mobile devices utilize position determination techniques to provide location based-services to the user of the mobile device, such as navigation applications, map information, content targeted to the location of the mobile device, and/or other location-based services. The mobile device can be configured to use signals from various types of wireless transmitters, including wireless access points providing Wireless Local Area Network (WLAN) connectivity and/or wireless base stations providing Wireless Wide Area Network (WWAN) connectivity (macrocells, picocells, microcells, femtocells, and/or other types of WWAN base station) can be used to determine the position of a mobile device.

The mobile device can be configured to perform periodic scans to detect wireless transmitters proximate to the mobile device the signals from which can be used to determine a position of the mobile device. Performing such scans can require significant resources on the mobile device, and can significantly impact the battery life of the mobile device.

SUMMARY

An example method for determining a position of a mobile device according to the disclosure includes determining coarse location information for the mobile device, sending the coarse location information for the mobile device to a location server, receiving from the location server almanac data responsive to the coarse location information where the almanac data includes Media Access Control (MAC) addresses of one or more wireless access points and most recently used channel identification, selecting a set of wireless access points proximate to the mobile device from the almanac data, measuring signals received from the set of selected wireless access points, and determining the position of the mobile device based at least in part on the signals measured.

Implementations of such a method may include one or more of the following features. The most recently used channel identification includes a channel number, a channel frequency, or a combination thereof. The almanac data includes MAC addresses and associated channel identification. The almanac data include transceiver reliability metrics. The transceiver reliability metrics include RSSI reliability metrics. The transceiver reliability metrics comprise of RTT reliability metrics. Identifying a subset of wireless access points from the set of wireless access points from which the mobile device was able to measure the signals, identifying active channels associated with the subset of wireless access points on which the subset of wireless access points were transmitting at the time that signals were measured, and sending identifiers associated with the subset of wireless access points and active channels to the location server. Determining a power status of the mobile device. Performing the following responsive to the power status of the mobile device exceeding a predetermined threshold: performing a scan for wireless access points proximate to the mobile device, measuring signals received from the wireless access points detected during the scan, and determining the position of the mobile device based at least in part on the signals measured from the wireless access points detected during the scan. Selecting the set of wireless access points proximate to the mobile device from the almanac data includes selecting wireless access points operating on a same channel.

An example mobile device for determining a position of the mobile device according to the disclosure includes a tangible, non-transitory computer-readable memory, a processor connected to the tangible, non-transitory computer-readable memory, and a transceiver. The processor is configured to: determine coarse location information for the mobile device, and the transceiver configured to send the coarse location information for the mobile device to a location server and to receive, from the location server, almanac data responsive to the coarse location information, the almanac data comprising Media Access Control (MAC) addresses of one or more wireless access points and most recently used channel identification. The processor is further configured to select a set of wireless access points proximate to the mobile device from the almanac data; and the transceiver is further configured to measure signals received from the set of selected wireless access points. The processor is further configured to determine the position of the mobile device based at least in part on the signals measured.

Implementations of such a mobile device may include one or more of the following features. The most recently used channel identification includes a channel number, a channel frequency, or a combination thereof. The almanac data further includes MAC addresses and associated channel identification. The almanac data further includes transceiver reliability metrics. The transceiver reliability metrics include RSSI reliability metrics. The transceiver reliability metrics include RTT reliability metrics. The processor is further configured to identify a subset of wireless access points from the set of wireless access points from which the mobile device was able to measure the signals, identify active channels associated with the subset of wireless access points on which the subset of wireless access points were transmitting at the time that signals were measured, and send identifiers associated with the subset of wireless access points and active channels to the location server. The processor is further configured to determine a power status of the mobile device. The processor is configured to perform the following responsive to the power status of the mobile device exceeding a predetermined threshold: perform a scan for wireless access points proximate to the mobile device, measure signals received from the wireless access points detected during the scan, and determine the position of the mobile device based at least in part on the signals measured from the wireless access points detected during the scan. The processor being configured to select the set of wireless access points proximate to the mobile device from the almanac data is further configured to select wireless access points operating on a same channel.

An example method for providing almanac data to a mobile device according to the disclosure includes receiving coarse location information from the mobile device, selecting almanac data responsive to receiving the coarse location information, the almanac data comprising Media Access Control (MAC) addresses of one or more wireless access points and most recently used channel identification, and sending the almanac data selected to the mobile device.

Implementations of such a method may include one or more of the following features. The most recently used channel identification comprises a channel number, a channel frequency, or a combination thereof. The almanac data further comprises MAC addresses and associated channel identification. The almanac data further comprises transceiver reliability metrics. The transceiver reliability metrics comprise RSSI reliability metrics. The transceiver reliability metrics comprise of RTT reliability metrics.

An example method for organizing almanac data according to the disclosure includes obtaining wireless access point data associated with a plurality of wireless access points, and binning the wireless access point data based on location to generate binned almanac data, where the binned almanac data comprising Media Access Control (MAC) addresses of one or more wireless access points, most recently used channel identification, and positioning effectiveness criteria. Receiving a coarse location from the mobile device, selecting a subset of almanac data from the binned almanac data based on the coarse location of the mobile device, and sending the subset of almanac data to the mobile device.

Implementations of such a method may include one or more of the following features. Selecting a subset of almanac data from the binned almanac data based on the coarse location of the mobile device further comprises selecting the subset of the almanac data based at least in part on the coarse location of the mobile device and on positioning effectiveness criteria. The positioning effectiveness criteria comprise signal reliability metrics, channel identification information, or a combination of signal reliability metrics and channel identification information.

DETAILED DESCRIPTION

Techniques disclosed herein provide for precise indoor positioning for determining the position of a mobile device within an indoor environment. A mobile device can measure signals from wireless transmitters proximate to the mobile device, such as wireless access points, to determine the position of the mobile device. But, the mobile device may not have information available as to which wireless transmitters are proximate to the mobile device. One way to address this issue is have the mobile device conduct a discovery scan for wireless transmitters proximate to the mobile device that the mobile device can use to determine the position of the mobile device. However, discovery scans can take a long time to complete and can consume a lot of power, which can quickly drain the battery of the mobile device. Discovery scan are also limited by dwell time and may be limited by a number of wireless transmitters that can be included in the discovery scan. In the techniques disclosed herein, the mobile device can determine whether the mobile device is operating under a power status that allows the mobile device to conduct a discovery scan or whether the mobile device should instead rely on almanac data received from a location server. The mobile device can determine a coarse location of the mobile device and send the coarse location to a location server to obtain almanac data that the mobile device can use to determine the location of the mobile device. The location server can also be configured to provide customized almanac information to the mobile device based on the coarse location of the mobile device.

Example Network Environment

Figure 1:
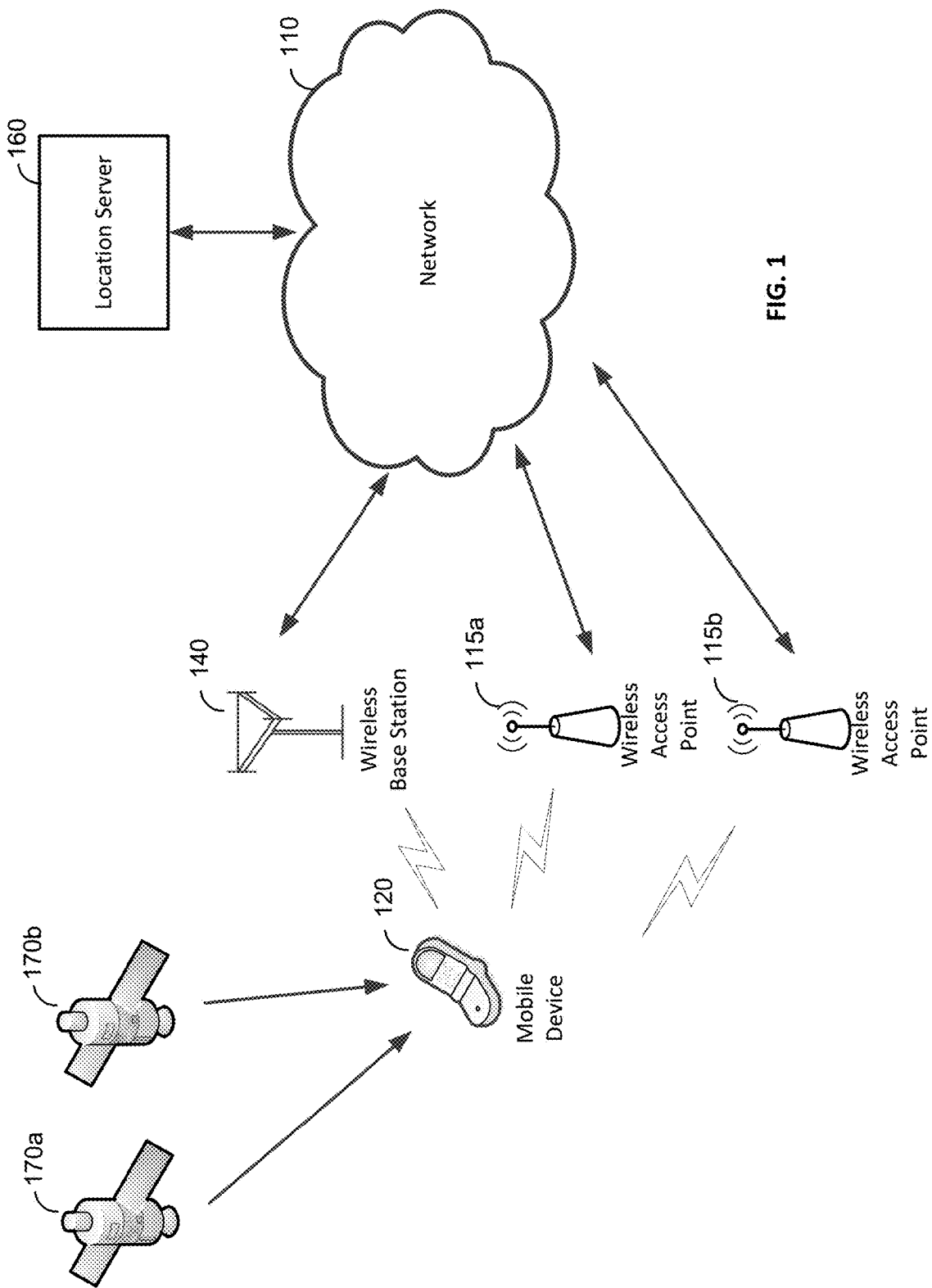
FIG. 1 is a block diagram of an example network architecture, which may be suitable for an implementing the techniques discussed herein.

FIG. 1 is a block diagram of an example network architecture, which may be suitable for an implementing the techniques discussed herein. The particular configuration illustrated herein is merely an example of one network configuration in which the techniques disclosed herein may be used. Furthermore, an implementation of such a network architecture may include additional elements that are not illustrated herein and have been omitted for the sake of clarity.

The mobile device 120 may also be referred to as a User Equipment (UE), a mobile station, a terminal, an access terminal, a subscriber unit, a station, etc. The mobile device 120 may be a smartphone, a tablet computer, a laptop computer, or other device that includes a wireless transceiver that is configured to communicate using one or more wireless communications protocols, including, but not limited to, the Long Term Evolution (LTE), WiFi, and WiMAX wireless communications protocols. The mobile device 120 can also be configured to support other types of wireless communications protocols and can be configured to support multiple different wireless communications protocols. The wireless transceiver of the mobile device 120 can be configured to send data to and/or receive data from other mobile devices 120, the wireless access points 115, and/or one or more wireless base stations 140.

The mobile device 120 can be configured to include a Global Navigation Satellite System (GNSS) receiver configured to receive and measure signals from one or more satellites 170, such as satellites 170a and 170b, and to obtain pseudo-range measurements for the satellites 170. Satellites 170 may be part of a Global Navigation Satellite System (GNSS), which may be the United States Global Positioning System (GPS), the European Galileo system, the Russian GLONASS system, or some other GNSS. The GNSS receiver may also be configured to detect and receive signals from satellites 170 belonging to more than one GNSS system. For example, satellite 170a could belong to the GPS system while the satellite 170b could belong to the Galileo system. While the example network architecture illustrated herein illustrates only two satellites 170, other implementations may have more or less satellites available, may have satellites associated with one or more GNSS system, and the number of satellites visible to the mobile device 120 may depend upon the current geographical location of the mobile devices and the orbits of the satellites 170.

The mobile device 120 may also measure signals from one or more wireless base stations or wireless access points, such as the wireless access points 115 and the wireless base station 140, and obtain timing measurements (e.g., for time of arrival (TOA) or observed time difference of arrival (OTDOA)), signal strength measurements (e.g., Receive Signal Strength Indication (RSSI)), RTT (round-trip time) and/or signal quality measurements for the wireless base stations. The pseudo-range measurements, timing measurements, signal strength measurements, and/or signal quality measurements may be used to derive a location estimate for the mobile device 120. A location estimate may also be referred to as a position estimate, a position fix, etc. Two terrestrial wireless access points are illustrated in this example: 115*a* and 115*b*. However, in other implementations, more or less wireless access points 115 may be included. The mobile device 120 can also be configured to use a combination of signals from one or more of the satellites 170, the wireless base station 140, and/or the wireless access points 115 to determine a position of the mobile device 120.

Each of the wireless access points 115 can comprise a WLAN wireless access point configured to operate using the IEEE 802.11 wireless communication standards. But, in some implementations some or all of the wireless access points 115 can comprise other types of wireless transmitters and/or receivers that can be configured to utilize other wireless communications protocols, and some network environments may include a more than one type of wireless access point 115. Some or all of the wireless access points 115 may be transmitters configured to send data only, while others may comprise transceivers that can both send and receive data wirelessly. The wireless access point 115 can be connected to network 110 via a backhaul connection that provides a broadband connection to the network 110. The network 110 may be the Internet and/or a combination of one or more networks. For example, the wireless access point 115 may be connected to a DSL modem or a cable modem, depending upon the type of broadband service being used in that particular implementation. A wireless access point 115 can be associated with a mobile communication network provider and can be configured to communicate with the mobile communication network provider's network (not shown) via the network 110. The coverage area of the a wireless access point 115 may overlap with that of one or more wireless base stations, such as wireless base station 140, or that of one or more other terrestrial transceivers.

The wireless base station 140 can be configured to provide wireless network connectivity to a plurality of mobile devices 120. The wireless base station 140 may comprise a macrocell base station or other type of base station. The wireless base station 140 may have a much larger coverage area than the wireless access point 115 or may be a terrestrial transceiver that provides a coverage area that is of a similar size or of a smaller size than the coverage area provided by the wireless access point 115. Wireless base station 140 can be configured to communicate using one or more wireless communications protocols. While the example illustrated in FIG. 1 includes on a single wireless base station 140, in other implementations the network environment is likely to include more than wireless base station 140 which have coverage areas that may overlap at least in part.

The location server 160 can be configured to provide location services to the mobile device 120. For example, the location server 160 can be configured to provide almanac information and/or other information that the mobile device 120 can use to determine the position of the mobile device 120. The location server 160 can also be configured to assist the mobile device 120 in determining the position of the mobile device 120. For example, the location server 160 can be configured to receive signal measurements of signals received at the mobile device 120 from wireless access points 115 and/or wireless base stations 140 and to determine a position of the mobile device 120 based on those signals.

The location server 160 can be configured to generate almanac data that can be used by the mobile device 120 in determining a position of the mobile device 120. The contents of the almanac data and how the almanac data can be generated and provided to the mobile device 120 are discussed in detail below with respect to FIG. 7, which discusses an example implementation of the location server 160 in greater detail.

The location server 160 can be configured to collect almanac data using crowdsourcing techniques. The location server 160 can be configure to send a discovery search request to one or more mobile devices 120 and/or one or more wireless access points 115. The wireless access points 115 and/or the mobile devices 120 can be configured to conduct passive and/or active scans for wireless access points proximate to the location of the device performing the scan and to send discovery scan results to the location server 160. The location sever 160 can be configured to identify geographical areas for which almanac data coverage is lacking and to send discovery search requests to mobile devices 120 and/or wireless access points 115 in those geographical areas to conduct discovery scans. The location server 160 can also be configured to receive information from mobile devices 120 regarding the availability of wireless access points 115 included in the almanac data provided by the location server 160. For example, the mobile devices 120 can be configured to report whether signal strength measurements (e.g. RTT, RSSI) measurements for a particular wireless access point 115 included in almanac data provided to the mobile device 120 by the location server 160 could be obtained by the mobile device 120. The location server 160 can be configured to update the almanac information maintained by the location server 160 if a particular wireless access point 115 is reported to have been unresponsive or undetected a threshold number of times. The almanac information can be update to remove the unresponsive or undetected wireless access point 115. The location server 160 can also be configured to send requests to one or more wireless access points 115 and/or mobile devices 120 proximate to a location where the unresponsive or undetected wireless access point 115 was indicated as having been located in the almanac data to determine whether the unresponsive or undetected wireless access point 115 may have moved from that location or may have been reconfigured to operate using a different frequency or channel.

The example network configuration illustrated in FIG. 1 is merely an example of one possible configuration of a network in which the techniques disclosed herein may be implemented. Other network configurations may include additional elements not illustrated in FIG. 1 and the various components may be interconnected in a different configuration than what is shown in FIG. 1.

Example Hardware

Figure 2:
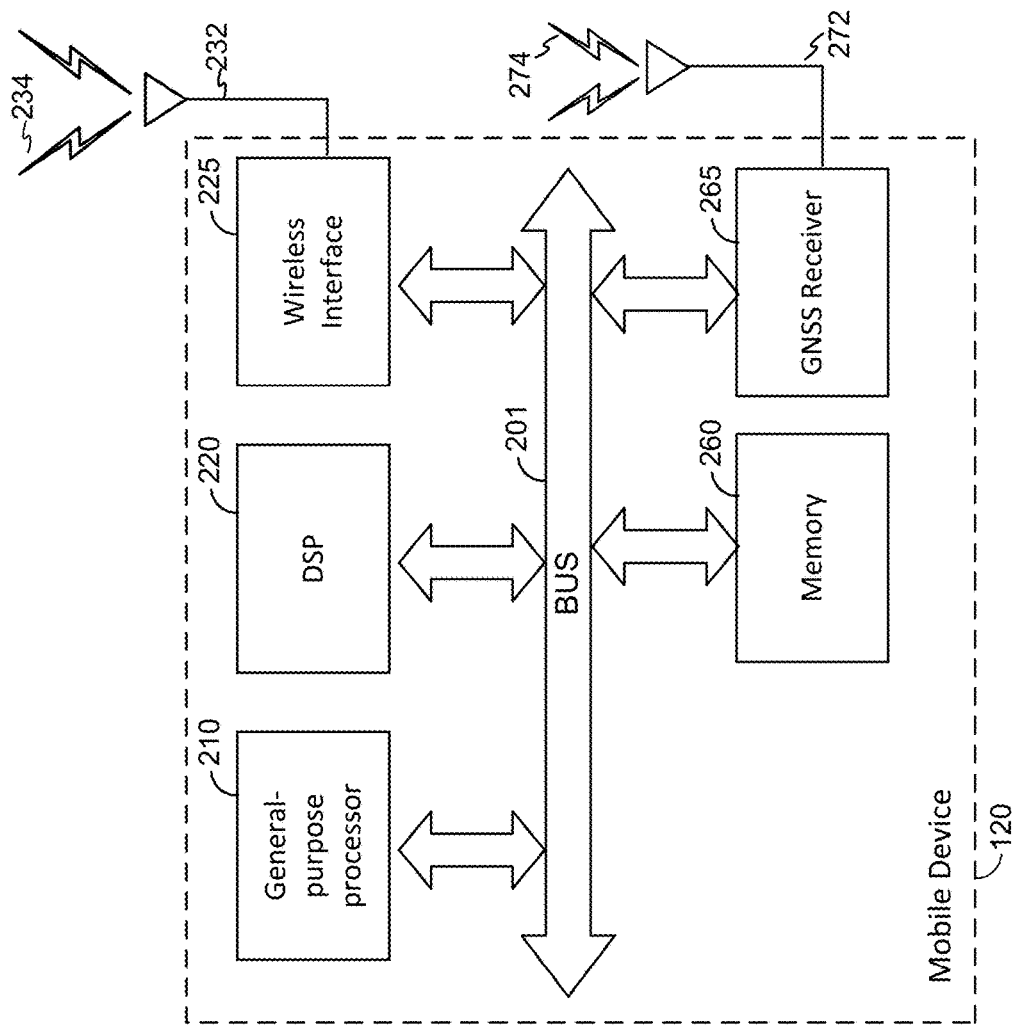
FIG. 2 is a block diagram of a mobile device that can be used to implement the mobile device illustrated in FIG. 1.

FIG. 2 is a block diagram of a mobile device that can be used to implement the mobile device 120 illustrated in FIG. 1. The mobile device 120 can be used to implement, at least in part, the processes illustrated in FIG. 8-10.

The mobile device 120 comprises a computer system including a general-purpose processor 210, a digital signal processor (DSP) 220, a wireless interface 225, a GNSS interface 265, and a non-transitory memory 260, connected to each other by a bus 201. Other implementations of the mobile device 120 may include additional elements not illustrated in the example implementation of FIG. 2 and/or may not include all of the elements illustrated in the example embodiment illustrated in FIG. 2. For example, some implementations of the mobile device 120 may not include the GNSS interface 265.

The wireless interface 225 can include a wireless receiver, transmitter, transceiver, and/or other elements that enable the mobile device 120 to send and/or receive data using WWAN, WLAN, and/or other wireless communication protocols. The wireless interface 225 can comprise one or more multi-mode modems capable of transmitting and receiving wireless signals using multiple wireless communications standards. The wireless interface 225 is connected by a line 232 to an antenna 234 for sending and receiving communications to/from the wireless access points 115, the wireless base station 140, and/or other wireless devices configured to communicate using wireless communication protocols. While the mobile device 120 illustrated in FIG. 2 comprises a single wireless interface 225 and a single antenna 234, other implementations of the mobile device 120 can include multiple wireless interfaces 225 and/or multiple antennas 234.

The GNSS interface 265 can include a wireless receiver and/or other elements that enable the mobile device 120 to receive signals from transmitters associated with one or more GNSS systems. The GNSS interface 265 is connected by a line 272 to an antenna 274 for receiving signals from the GNSS transmitters, such as the satellites 170 illustrated in FIG. 1. The mobile device 120 can be configured to use signals received from satellites associated with satellites and other transmitters associated with the GNSS systems to determine a position of the mobile device 120. The mobile device 120 can also be configured to use the signals received from the satellites and other transmitters associated with the GNSS systems in conjunction with signals received from wireless access points 115 and/or wireless base stations 140 to determine a position of the mobile device 120.

The DSP 220 can be configured to process signals received from the wireless interface 225 and/or the GNSS interface 265 and may be configured to process signals for or in conjunction with one or more modules implemented as processor-readable, processor-executable software code stored in memory 260 and/or can be configured process signals in conjunction with the processor 210.

The processor 210 can be an intelligent device, e.g., a personal computer central processing unit (CPU) such as those made by Intel® Corporation or AMD®, a microcontroller, an application specific integrated circuit (ASIC), etc. The memory 260 is a non-transitory storage device that can include random access memory (RAM), read-only memory (ROM), or a combination thereof. The memory 260 can store processor-readable, processor-executable software code containing instructions for controlling the processor 210 to perform functions described herein (although the description may read that the software performs the function(s)). The software can be loaded onto the memory 260 by being downloaded via a network connection, uploaded from a disk, etc. Further, the software may not be directly executable, e.g., requiring compiling before execution.

The software in the memory 260 is configured to enable the processor 210 to perform various actions, including implementing sending and/or receiving data from the wireless access points 115, the wireless base station 140, other mobile devices 120, and/or other devices configured for wireless communication.

Figure 3:
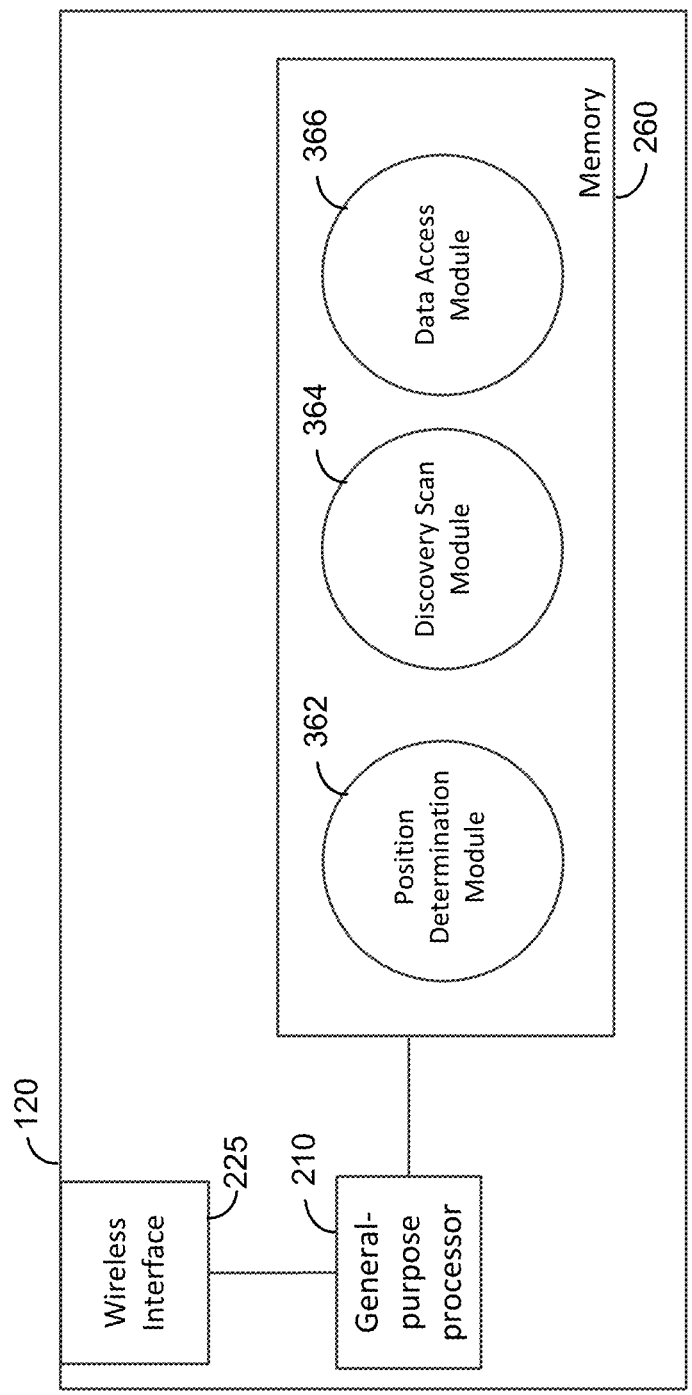
FIG. 3 is a functional block diagram of the mobile device illustrated in FIG. 2 that illustrates functional modules of the memory shown in FIG. 2.

FIG. 3 is a functional block diagram of the mobile device 120 illustrated in FIG. 2 that illustrates functional modules of the memory 260 shown in FIG. 2. For example, the mobile device 120 can include a position determination module 362, a discovery scan module 364, and a data access module 368. The mobile device 120 may also include one or more additional functional modules that provide other functionality to the mobile device 120. The functional modules illustrated in FIG. 3 may be implemented as software as illustrated in FIG. 3 or may be implemented in hardware or a combination of hardware and software. The mobile device 120 illustrated in FIGS. 2 and 3 can be used to implement the mobile device 120 associated with the processes illustrated in FIGS. 8-10.

The position determination module 362 can be configured to determine a position of the mobile device 120. The position determination module 362 can provide means for determining the position of the mobile device based at least in part on the signal measurements. For example, the position determination module 362 can be configured to receive pseudorange data from the GNSS interface 265 and use the pseudorange data to determine a position of the mobile device 120. The position determination module 362 can also be configured to request and receive almanac data from a network entity, such as the location server 160. The position determination module 362 can also be configured to use measurements of signals received from wireless base stations 140 and/or wireless access points 115 to determine a position of the mobile device 120. The position determination module 362 can also be configured to use pseudorange information from the GNSS interface 265 and measurements of signals received from wireless base stations 140 and/or wireless access points 115 to determine a position of the mobile device 120. The position determination module 362 can be configured to determine a position of the mobile device 120 by performing trilateration using signal measurements, RSSI (received signal strength indication), RTT (round-trip time)), time of arrival (TOA), to determine a position of the mobile device 120. The position determination module 362 can be configured to determine the position of the mobile device in response to a request from an application running on the mobile device, in response to an external entity, such as the location server 160, requesting a position of the mobile device, or in response to a request from another module of the mobile device. Furthermore, the wireless interface 225 can provide means for sending and/or receiving data and/or requests, except for GNSS signal data for which the GNSS receiver of the GNSS interface 265 can provide means for receiving such data.

The position determination module 362 can be configured to use almanac data to determine the position of the mobile device 120. The almanac data can include information, which can facilitate the acquisition of signal measurements that the position determination module 362 can use to determine the position of the mobile device. The information that can be contained in the almanac data is discussed in detail about with respect to the location server 160. The position determination module 362 can be configured to instruct the discovery scan module 364 to conduct a scan for wireless access points 115 proximate to the mobile device 120 that the mobile device from which the mobile device 120 can measure signals and determine a position of the mobile device 120 based on the measured signals. The position determination module 362 can be configured to conduct a discovery scan when the mobile device 120 is operating under a first power status where power consumption is not currently constrained and to request and use almanac data when the mobile device 120 is operating under a second power status where power consumption is constrained. Conducting a scan for wireless access point proximate to the mobile device 120 may consume a significant amount of power. The mobile device 120 may be operating under the first power status where the battery or other power supply of the mobile device 120 is charged above a threshold power level or where the mobile device 120 is receiving power from an external power source and is not depleting the battery or other power supply of the mobile device 120. The mobile device 120 may be operating under the second power status where the mobile device 120 not power constrained and can perform a more power intensive discovery scan for wireless access points 115 proximate to the mobile device 120 rather than rely on almanac data received from the location server 160. The power mode under which the mobile device is operating can be determined by the position determination module 362 and/or the discovery scan module 364. The position determination module 362 can be configured to perform the following responsive to the power status of the mobile device exceeding a predetermined threshold: perform a scan for wireless access points proximate to the mobile device (in conjunction with the discovery scan module 364), measuring signals received from the wireless access points detected during the scan, and determine the position of the mobile device based at least in part on the signals measured from the wireless access points detected during the scan.

The position determination module 362 can be configured to use the almanac data to select a set of wireless access points proximate to the mobile device 120 and to measure signals from the wireless access points 115 that were selected to determine the position of the mobile device. The position determination module 362 can be configured to select wireless access points operating on a same channel and/or frequency, when possible, to facilitate measurement of the signals that can be used to determine the position of the mobile device. If the selected wireless access points are all operating on the same channel and/or frequency, the position determination module 362 will not need to instruct the wireless interface 225 to switch between channels and/or frequencies.

The position determination module 362 can provide means for determining a coarse location of the mobile device, sending the coarse location of the mobile device to a location server, means for receiving from the location server almanac data responsive to the coarse location where the almanac data includes Media Access Control (MAC) addresses of one or more wireless access points and most recently used channel identification, means for selecting a set of wireless access points proximate to the mobile device from the almanac data, means for measuring signals received from the set of selected wireless access points, and means for determining the position of the mobile device based at least in part on the signals measured. The position determination module 362 can also provide means for identifying a subset of wireless access points from the set of wireless access points from which the mobile device was able to measure the signals. The position determination module 362 can be configured to identify channels on which the subset of wireless access points were determined to be transmitting at the time that the signals were measured (these channels are also referred to herein as "active channels") and to send identifiers associated with the subset of wireless access points and the active channels to the location server. The position determination module 362 can provide means for determining a power status of the mobile device. The position determination module 362 can provide means for performing the following responsive to the power status of the mobile device exceeding a predetermined threshold: performing a scan for wireless access points proximate to the mobile device; measuring signals received from the wireless access points detected during the scan; and determining the position of the mobile device based at least in part on the signals measured from the wireless access points detected during the scan. The position determination module 362 can provide means for selecting wireless access points operating on a same channel for use in determining a position of the mobile device.

The processor 210 can also provide means for implementing the various modules of the mobile device 120 discussed herein and may operate in conjunction with one or more modules implemented in firmware.

The discovery scan module 364 can be configured to perform active and/or passive scans for wireless access points proximate to the mobile device 120. The discovery scan module 364 can be configured to identify wireless access points 115 proximate to the mobile device 120 that are configured to receive requests from the mobile device 120 to perform active and/or passive scans for other wireless access points 115 proximate to the wireless access points 115 and to provide the results of the scans to the mobile device 120. The discovery scan module 364 can be configured to respond to discovery requests from the location server 160 to conduct a discovery scan and to send the results of the discovery scan to the location server 160. The discovery scan module 364 can also be configured to send the results of discovery scans initiated by the mobile device 120 to the location server 160, and the location server 160 may be configured to use the received discovery scan results to update the almanac data maintained by the location server 160.

The discovery scan module 364 can be configured to send a request to one or more of the wireless access points 115 to perform an active and/or passive scan for wireless access points 115 on behalf of the mobile device 120. The discovery scan module 364 can be configured to send the request in the form of a WLAN Radio Measurement frame to the one or more wireless access points 115. The wireless access points 115 receiving the request can be configured to perform the requested active and/or passive scan and to provide the results of the scan to the mobile device 120. The scan request can specify one or more channels on which the mobile device 120 is requesting that the one or more wireless access points 115 perform the active and/or passive scans. The assisted discovery techniques implemented by the discovery scan module can allow the mobile device 120 to perform a more extensive scan for wireless access points 115 proximate to the mobile device 120 than may have been possible using conventional discovery scan techniques in which the mobile device 120 performs the scans itself. Scanning across multiple channels for signals from the wireless access points 115 can consume significant amounts of processing resources and wireless interface resources. Scanning can also consume limited power resources where the mobile device 120 is not receiving power from an external power source and is instead operating on a battery or other power source of the mobile device 120.

A passive scan is a scan across one or more channels in which wireless access points 115 may be operating in which the discovery scan module 364 or a wireless access point 115 performing a scan on behalf of the mobile device 120 or location server 160 listens for transmissions from one or more wireless access points 115. The transmissions from the wireless access points 115 can be used to identify the wireless access point 115 making the transmission. For example, where a wireless access point 115 is configured to operate using one of the wireless local area network (WLAN) specifications such as the IEEE 802.11 family of wireless communication protocols, the discovery scan module 364 or the wireless access point 115 performing a scan on behalf of the mobile device 120 can be configured to listen for beacons and/or probe responses transmitted by the wireless access points 115 proximate to the mobile device 120 or the wireless access point 115 performing the scan on behalf of the mobile device 120. During a passive scan, the mobile device 120 or the wireless access point 115 performing the scan on behalf of the mobile device 120 does not transmit probe requests or other transmissions to elicit a response from the wireless access points 115 proximate to the device conducting the passive scan. One risk associated with passive scanning is that wireless access points 115 that do not broadcast a beacon or other indication of their presence could be missed by the device conducting the passive scan.

An active scan is a scan across one or more channels in which wireless access points 115 may be operating in which the discovery scan module 364 or a wireless access point 115 performing a scan on behalf of the mobile device 120 or location server 160 actively solicits the wireless access points 115 for responses in addition to listening for transmissions from one or more wireless access points 115. A device conducting an active scan can be configured to transmit probe requests that include a null SSID name (a probe-any request) to solicit responses from all wireless access points 115 configured to receive and respond to such probe requests. Active scanning can consume more power than passive scans because the device conducting the scan is transmitting requests as well as listening for beacons and/or probe request responses from wireless access points 115 proximate to the device conducting the active scan.

The discovery scan module 364 can be configured to process scan reports provided by wireless access points 115 and to update information that identifies wireless access points proximate to the mobile device 120. The wireless access point information can be stored in the memory 260 and can be accessed and/or updated by the discovery scan module 364 via the data access module 366. The position determination module 362 can be configured to use the wireless access point information to determine the location of the mobile device. For example, the position determination module 362 can be configured to select wireless access points 115 from the list of wireless access points 115 proximate to the mobile device 120 and to take signal measurements that the position determination module 362 can use to determine a position of the mobile device 120. The position determination module 362 can also be configured to send the signal measurements to a location server or other network entity that is configured to determine the position of the mobile device and/or provide assistance data to the mobile device 120 that the mobile device 120 can use to determine the position of the mobile device 120.

The data access module 366 can be configured to store data in the memory 260 and/or other data storage devices associated with the mobile device 120. The data access module 366 can also be configured to access data in the memory 260 and/or other data storage devices associated with the mobile device 120. The data access module 366 can be configured to receive requests from other modules and/or components of the mobile device 120 and to store and/or access data stored in the memory 260 and/or other data storage devices associated with the mobile device 120. For example, the data access module 366 can be configured to store almanac data received by the position determination module 362 from the location server 160 via the wireless interface 225 and to store the almanac information in the memory 260 of the mobile device. The data access module 366 can also be configured to access almanac data and/or other data stored in the memory 260 for the other modules or components of the mobile device 120.

Figure 4:
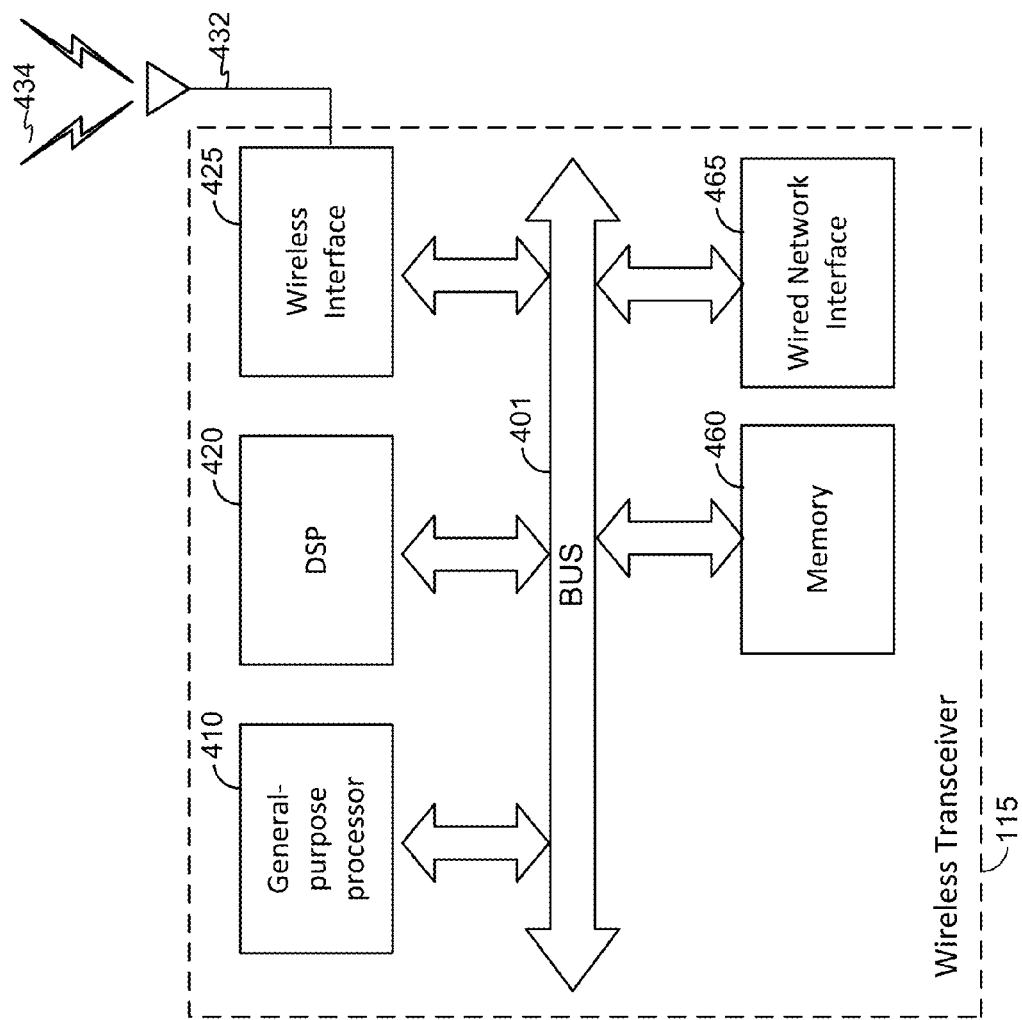
FIG. 4 is a block diagram of a wireless access point that can be used to implement the wireless access points illustrated in FIG. 1.

FIG. 4 is a block diagram of a wireless access point that can be used to implement the wireless access points 115 illustrated in FIG. 1. The wireless access point 115 can be used to implement stages of the processes of FIGS. 8-10 involving a wireless access point 115. The wireless access point 115 can also be used to implement processes in which the mobile device 120 and/or the location server 160 requests a discovery scan from the wireless access point 115, the wireless access point 115 performs the discovery scan, and the wireless access point 115 sends the discovery scan results to the device requesting the discovery scan.

The wireless access point 115 comprises a computer system including a general-purpose processor 410, a digital signal processor (DSP) 420, a wireless interface 425, a wired network interface 465, and a non-transitory memory 460, connected to each other by a bus 401. Other implementations of the wireless access point 115 may include additional elements not illustrated in the example implementation of FIG. 5 and/or may not include all of the elements illustrated in the example embodiment illustrated in FIG. 5. For example, some implementations of the wireless access point 115 may not include the wired network interface 465.

The wireless interface 425 can include a wireless receiver, transmitter, transceiver, and/or other elements that enable the wireless interface 425 to send and/or receive data using WWAN, WLAN, and/or other wireless communication protocols. The wireless interface 425 can comprise one or more multi-mode modems capable of transmitting and receiving wireless signals using multiple wireless communications standards. The wireless interface 425 is connected by a line 432 to an antenna 434 for sending and receiving communications to/from the mobile device 120, the wireless base station 140, and/or other wireless devices configured to communicate using wireless communication protocols. While the wireless access point 115 illustrated in FIG. 4 comprises a single wireless interface 425 and a single antenna 434, other implementations of the wireless access point 115 can include multiple wireless interfaces 425 and/or multiple antennas 434. In some implementations, the wireless access point 115 can be configured to provide wireless network access to the mobile device 120 and/or other wireless devices. For example, the wireless access point 115 can be configured to operate as a WLAN access point that can provide wireless connectivity to the mobile device 120 and/or other devices configured to communicate using WLAN wireless communication protocols. In some implementations, the wireless access point 115 can be configured to provide network connectivity to the mobile device 120 using a first wireless protocol and to connect to the Internet or other network via a second wireless protocol. For example, the wireless access point 115 can be configured to connect to the network 110 via a WWAN wireless communication protocol and to connect to the mobile device 120 using a WLAN wireless communication protocol.

The wireless access point 115 can also include wired network interface 465 that provides wired network connectivity to the network 110. For example, the wired network connection can comprise a wired broadband connection, and the wired network interface 465 can be configured to comprise or connect to a cable modem and/or a Digital Subscriber Line (DSL) modem. The wired network interface 465 can be configured to send and/or receive data via the wired network connection.

The DSP 420 can be configured to process signals received from the wireless interface 425 and/or the wired network interface 465 and may be configured to process signals for or in conjunction with one or more modules implemented as processor-readable, processor-executable software code stored in memory 460 and/or can be configured process signals in conjunction with the processor 410.

The processor 410 can be an intelligent device, e.g., a personal computer central processing unit (CPU) such as those made by Intel® Corporation or AMD®, a microcontroller, an application specific integrated circuit (ASIC), etc. The memory 460 is a non-transitory storage device that can include random access memory (RAM), read-only memory (ROM), or a combination thereof. The memory 460 can store processor-readable, processor-executable software code containing instructions for controlling the processor 410 to perform functions described herein (although the description may read that the software performs the function(s)). The software can be loaded onto the memory 460 by being downloaded via a network connection, uploaded from a disk, etc. Further, the software may not be directly executable, e.g., requiring compiling before execution.

Figure 5:
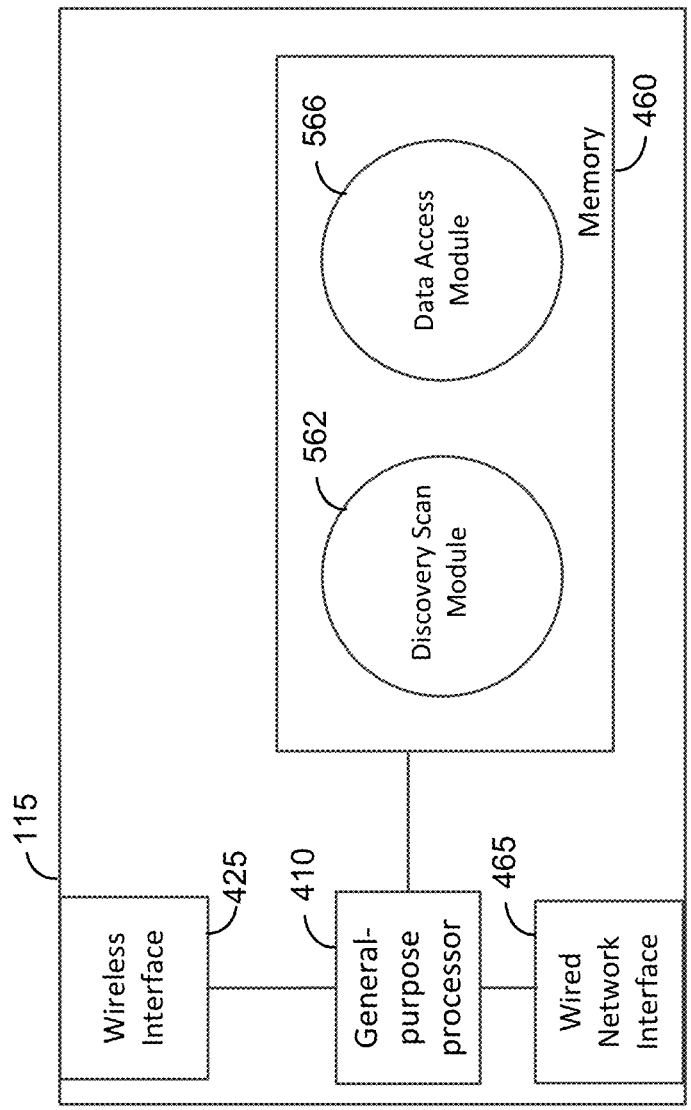
FIG. 5 is a functional block diagram of the wireless access point illustrated in FIG. 4 that illustrates functional modules of the memory shown in FIG. 4.

The software in the memory 460 is configured to enable the processor 410 to perform various actions, including implementing sending and/or receiving data from the mobile device 120, and/or other devices. For example, the memory 460 can include software that enables the wireless access point 115 to process discovery scan requests from mobile devices 120 and/or the location server 160, to perform the requested discovery scan, and to provide the discovery scan results to the device requesting the discovery scan. The memory 460 can also include software that enables the wireless access point to respond to probe requests and/or other FIG. 5 is a functional block diagram of the wireless access point 115 illustrated in FIG. 4 that illustrates functional modules of a memory 460 shown in FIG. 4. For example, the wireless access point 115 can include a discovery scan module 562, and a data access module 566. The wireless access point 115 may also include one or more additional functional modules that provide other functionality to the wireless access point 115. The functional modules illustrated in FIG. 5 may be implemented as software as illustrated in FIG. 5 or may be implemented in hardware or a combination of hardware and software. The wireless access point 115 illustrated in FIGS. 4 and 5 can be used to implement stages of the processes of FIGS. 8-10 involving a wireless access point 115. The wireless access point 115 can also be used to implement processes in which the mobile device 120 and/or the location server 160 requests a discovery scan from the wireless access point 115, the wireless access point 115 performs the discovery scan, and the wireless access point 115 sends the discovery scan results to the device requesting the discovery scan.

The discovery scan module 562 can be configured to receive requests to perform discovery scans for wireless access points proximate to the wireless access point 115 from the mobile device 120 or the location server 160. The discovery scan module 562 can be configured to wirelessly receive the request from the mobile device 120 or via wired or wireless network connection from the location server 160. In some implementations, the discovery scan request can be in the form of a WLAN Radio Measurement frame. The request can specify a scan type to be performed and the discovery scan module 562 can be configured to operate the wireless interface 425 to scan for other wireless access points proximate to the wireless access point 115 according to the parameters defined in the request. For example, the request can specify whether an active or a passive scan is being requested. The discovery scan module 562 can perform the requested active and/or passive scan and can transmit the results of the scan to the requesting device via either wired or wireless network connection. The discovery scan module 562 can be configured to perform the scan for other wireless access points on multiple channels. The scan request can specify one or more channels on which the wireless access point 115 is to perform the active and/or passive scans.

The data access module 566 can be configured to store data in the memory 460 and/or other data storage devices associated with the wireless access point 115. The data access module 566 can also be configured to access data in the memory 460 and/or other data storage devices associated with the wireless access point 115. The data access module 566 can be configured to receive requests from other modules and/or components of the wireless access point 115 and to store and/or access data stored in the memory 460 and/or other data storage devices associated with the wireless access point 115.

Figure 6:
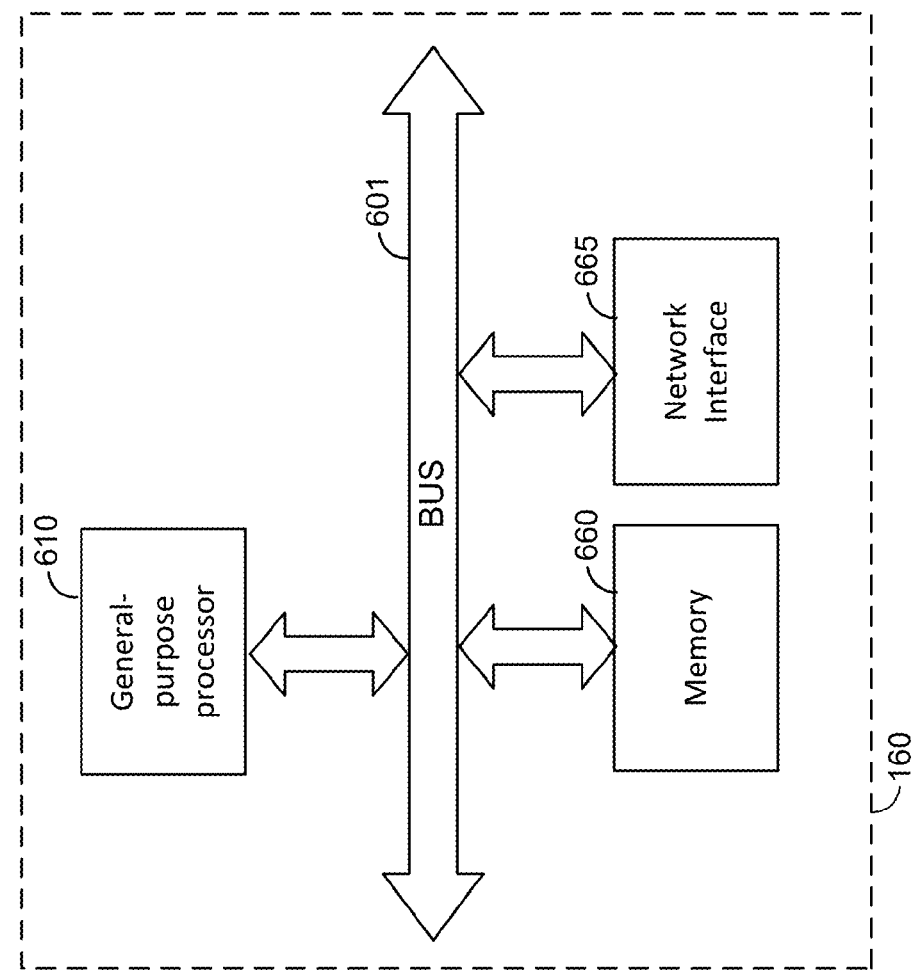
FIG. 6 is a block diagram of a location server that can be used to implement the location server illustrated in FIG. 1.

FIG. 6 is a block diagram of a location server that can be used to implement the location server 160 illustrated in FIG. 1. The location server 160 can be used to implement, at least in part, the processes illustrated in FIG. 8-10 involving a location server.

The location server 160 comprises a computer system including a general-purpose processor 610, a network interface 665, and a non-transitory memory 660, connected to each other by a bus 201. Other implementations of the location server 160 may include additional elements not illustrated in the example implementation of FIG. 6 and/or may not include all of the elements illustrated in the example embodiment illustrated in FIG. 6.

The location server can also include network interface 665 that provides wired and/or wireless network connectivity to the network 110. For example, the network connection can comprise a wired broadband connection, and the network interface 665 can be configured to comprise or connect to a cable modem and/or a Digital Subscriber Line (DSL) modem. The network interface 665 can be configured to send and/or receive data via the wired network connection. The network interface 665 can also include a wireless receiver, transmitter, transceiver, and/or other elements that enable the network interface 665 to send and/or receive data using WWAN, WLAN, and/or other wireless communication protocols. The network interface 665 can comprise one or more multi-mode modems capable of transmitting and receiving wireless signals using multiple wireless communications standards.

The processor 610 can be an intelligent device, e.g., a personal computer central processing unit (CPU) such as those made by Intel® Corporation or AMD®, a microcontroller, an application specific integrated circuit (ASIC), etc. The memory 660 is a non-transitory storage device that can include random access memory (RAM), read-only memory (ROM), or a combination thereof. The memory 660 can store processor-readable, processor-executable software code containing instructions for controlling the processor 610 to perform functions described herein (although the description may read that the software performs the function(s)). The software can be loaded onto the memory 660 by being downloaded via a network connection, uploaded from a disk, etc. Further, the software may not be directly executable, e.g., requiring compiling before execution.

The software in the memory 660 is configured to enable the processor 610 to perform various actions, including implementing the various processes discussed herein. For example, the software can include program code to cause the location server 160 to provide location-based services to a mobile device 120, to send requests to a mobile device 120 and/or a wireless access point 115 to perform a discovery scan, to receive and process discovery scan results from mobile devices 120 and/or wireless access points 115, to maintain almanac data in an almanac data store, to update the almanac data based on discovery scan results, and to provide subsets of the almanac data to mobile devices 120 to assist the mobile device with positioning.

Figure 7:
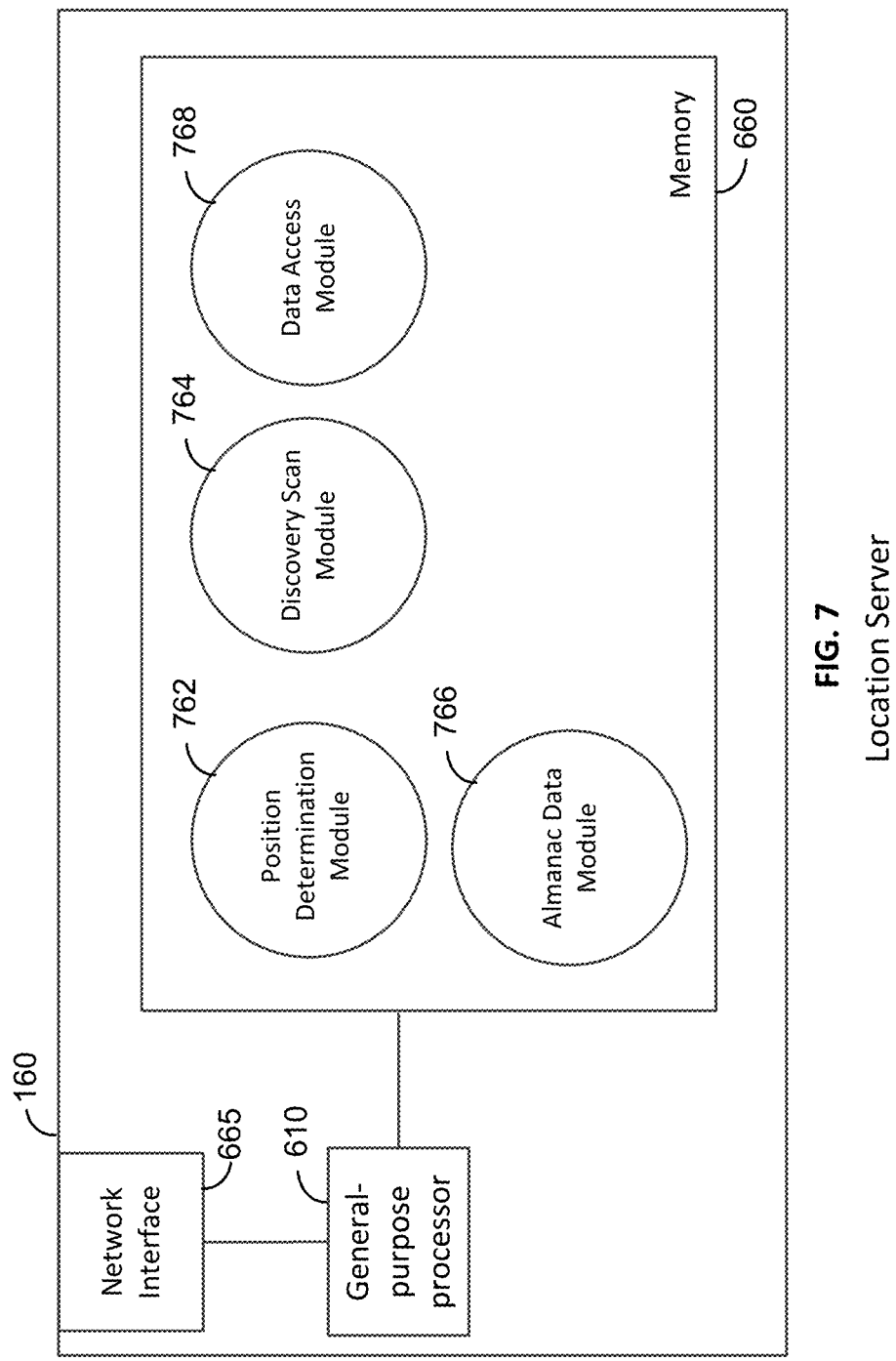
FIG. 7 is a functional block diagram of the location server illustrated in FIG. 6 that illustrates functional modules of the memory shown in FIG. 6.

FIG. 7 is a functional block diagram of the location server 160 illustrated in FIG. 7 that illustrates functional modules of a memory 660 shown in FIG. 7. For example, the location server 160 can include a position determination module 762, discovery scan module 764, a data access module 768, and an almanac data module 766. The location server 160 may also include one or more additional functional modules that provide other functionality to the location server 160. The functional modules illustrated in FIG. 7 may be implemented as software as illustrated in FIG. 7 or may be implemented in hardware or a combination of hardware and software. The location server 160 illustrated in FIGS. 6 and 7 can be used to implement the location server 160 associated with the processes illustrated in FIGS. 8-10.

The position determination module 762 can be configured to determine a position of the mobile device 120 and/or to provide other location-based services to the mobile device 120 or other devices. The position determination module 762 can provide means for determining the position of the mobile device based at least in part on the signal measurements received by the mobile device 120 and provided to the location server 160. For example, the position determination module 762 can be configured to receive pseudorange data collected by the GNSS interface 265 of the mobile device 120 and to use the pseudorange data to determine a position of the mobile device 120. The position determination module 762 can also be configured to use measurements of signals received from wireless base stations 140 and/or wireless access points 115 at the mobile device 120 to determine a position of the mobile device 120 or to use measurements of signals received from the mobile device 120 at the wireless base stations 140 and/or wireless access points 115 to determine a position of the mobile device 120. The position determination module 762 can also be configured to use a combination of pseudorange information and signal measurements to determine a position of the mobile device 120. The position determination module 762 can be configured to determine the position of the mobile device in response to a request from the mobile device 120 or in response to an external entity, such as another mobile device, requesting a position of the mobile device 120. The processor 610 can also provide means for implementing the various modules discussed herein and may operate in conjunction.

The discovery scan module 764 can be configured to send requests to mobile devices 120 and/or wireless access points 115 to perform active and/or passive scans for wireless access points proximate to the device receiving the request. The discovery scan module 764 can be configured to receive discovery scan results from mobile devices 120 and/or wireless access points 115 and to update the almanac data store maintained by the location server 160. The discovery scan module 764 can also be configured to compare discovery scan results received with the almanac data in the almanac data store to determine whether the almanac data needs to be update and to update the almanac data accordingly. The discovery scan module 764 can also be configured to identify geographical areas for which almanac data is limited or unavailable and to send discovery scan requests to mobile devices 120 and/or wireless access points 115 located in those geographical areas to collect discovery scan results and to construct almanac data for those geographical areas based on the discovery scan results.

The data access module 768 can be configured to store data in the memory 660 and/or other data storage devices associated with the location server 160. The data access module 768 can also be configured to access data in the memory 660 and/or other data storage devices associated with the location server 160. The data access module 768 can be configured to receive requests from other modules and/or components of the location server 160 and to store and/or access data stored in the memory 660 and/or other data storage devices associated with the location server 160. For example, the data access module 768 can be configured to store discovery scan results and/or updated or new almanac data in the memory 660. The data access module 768 can also be configured to access almanac data and/or other data stored in the memory 660 for the other modules or components of the location server 160.

The almanac data module 766 can be configured to store and update almanac data that can be provided to mobile devices 120 that can facilitate determining the position of the mobile device 120. The almanac data can be stored in an almanac data store that may be stored in the memory 660 of the location server and/or in other memory locations (not shown) which may be part of the location server 160 or may be external to the location server 160.

The almanac data can include the Media Access Control (MAC) addresses or other unique identifier of one or more wireless access points and most recently used channel information for each of the wireless access points. The wireless access points can comprise wireless devices capable of transmitting wireless signals and may also be capable of receiving wireless signals, such as the wireless access points 115. For example, the wireless access points may comprise WLAN access points. The almanac data can include a MAC address of each of the wireless access points or another unique identifier that can be used by a mobile device 120 to identify signals from the wireless access point 115. The almanac data can also include recently used channel identified for the one or more wireless access points 115 included in the almanac data. The channel or channels on which a wireless access point 115 operates could change over time, but the recently used channel information can facilitate the mobile device 120 being able to quickly acquire and measure signals from a wireless access point if the mobile device 120 has information indicating on which channel the wireless access point 115 was last observed operating. The most recently used channel identification can include a number, a channel frequency, or a combination thereof. The almanac data can also include one or more MAC addresses associated with the wireless access points 115 and associated channel information. The almanac data can also include one or more virtual MAC addresses associated with the wireless access points 115 and associated channel information. Virtual MAC addresses can be used to provide virtual wireless access points (VAPs) or virtual local area networks (VLANs) which can be used to segment wireless traffic. A virtual MAC address can be associated with each of the segments and segments may be configured to operate on different channels.

The almanac data can include signal reliability metrics associated with the wireless access points 115 included in the almanac data. The signal reliability metrics can be used when selecting wireless access points 115 from which signal measurements are to obtained for determining the position of the mobile device 120, and can be used to determine which of the wireless access points 115 proximate to the mobile device 120 may, if used, provide the most accurate position fix for the mobile device 120. The signal reliability metrics can include RSSI reliability metrics and/or RTT reliability metrics. The reliability of RSSI signal measurements can be affected by the type of environment in which a wireless access point 115 is located. For example, structural components of the environment, such as walls, columns, beams, and other such components proximate to wireless access point 115 can impact RSSI measurements of signals transmitted by that wireless access point 115. Other objects, such as furniture, machinery, and other objects disposed throughout the area around a wireless access point 115 can also impact RSSI measurements of signals transmitted by that wireless access point 115. The RSSI measurements obtained from wireless access point 115 could vary greatly depending upon where the mobile device 120 is positioned relative to the wireless access point 115 and which structural components or other objects are between the mobile device 120 and the wireless access point 115. Wireless access points in certain types of located near structural components proximate to structural components that may interfere with the reliability of RSSI measurements can be identified by the almanac data module 766 of the location server 160 based on map data of an indoor environment, where available. The location server 160 can also be configured to use crowd-sourced information reported by mobile devices 120 and/or by wireless access points 115 performing discovery scans to identify wireless access points whose RSSI and/or RTT measurements are unreliable. The location server 160 can associate a lower signal reliability score to a wireless access point 115 proximate to structural components or objects that are likely to interfere with RSSI measurements.

The almanac data module 766 of the location server 160 can be configured send a subset of the almanac data maintained by the location server to a mobile device 120 in response to the location server 160 receiving a coarse location of the mobile device. The coarse location represents an approximate location of the mobile device. The almanac data module 766 can provide almanac data that identifies wireless access points 115 and/or base stations 140 proximate to coarse location of the mobile device 120 that the mobile device 120 can use to determine a more precise location of the mobile device 120. The almanac data module 766 of the location server 160 can be configured to send just a subset of the almanac data maintained by the location server 160 to the mobile device 120 to reduce the amount of data traffic sent across the network and to take into consideration processing and available memory resources on the mobile device 120. The location server 160 can be configured to take into consideration data density when selecting the subset of the almanac data to send to the mobile device 120. The almanac data maintained by the almanac data module 766 of the location server 160 may include information identifying a larger number of wireless access points 115 in some geographical areas rather than others. These differences in data distribution or density may be due to differences in the number of wireless access points 115 disposed in a particular geographical area and/or may be due to how complete the coverage of the almanac data is for a particular geographical area. For geographical areas in which the data density is higher, the almanac data module 766 of the location server 160 can be configured to select a portion of the available wireless access points 115 for that particular geographical area to provide the mobile device 120 with a sufficient number of wireless access points 115 that the mobile device 120 can use to determine the position of the mobile device 120 rather than sending information for all of the wireless access points 115 in the area. The almanac data module 766 of the location server 160 can also be configured to select the wireless access points 115 to include in the subset of almanac data to be sent to the mobile device 120 based on geometry. For example, the almanac data module 766 can be configured to identify an approximate center point associated with a geographical area in which the mobile device 120 may be located based on coarse location information received from the mobile device 120. The almanac data module 766 can be configured to select a subset of wireless access points 115 from the almanac data that are disposed around the approximate center point of the geographical area in which the mobile device 120 may be located based on the coarse location. The almanac data module 766 can also be configured to select a subset of wireless access points 115 from the almanac data that are disposed throughout the geographical area in which the mobile device 120 may be located based on the coarse location information provided by the mobile device 120.

The almanac data module 766 of the location server 160 can be configured to update the almanac data store periodically or dynamically as mobile devices 120 and/or wireless access points 115 provide scan results to the location server 160.

The almanac data module 766 can provide means for receiving coarse location information from the mobile device, means for generating almanac data responsive to receiving the coarse location information where the almanac data includes Media Access Control (MAC) addresses of one or more wireless access points and most recently used channel identification, and means for sending the almanac data to the mobile device. The almanac data module 766 can also provide means for receiving wireless access point data associated with a plurality of wireless access points, means for binning the wireless access point data based on location, means for receiving a coarse location from a mobile device, means for selecting a subset of wireless access points from the plurality of wireless access points associated with the wireless access points data based on positioning effectiveness criteria, and means for sending almanac data to the mobile device comprising information associated with the subset of wireless access points.

Example Implementations

Figure 8:
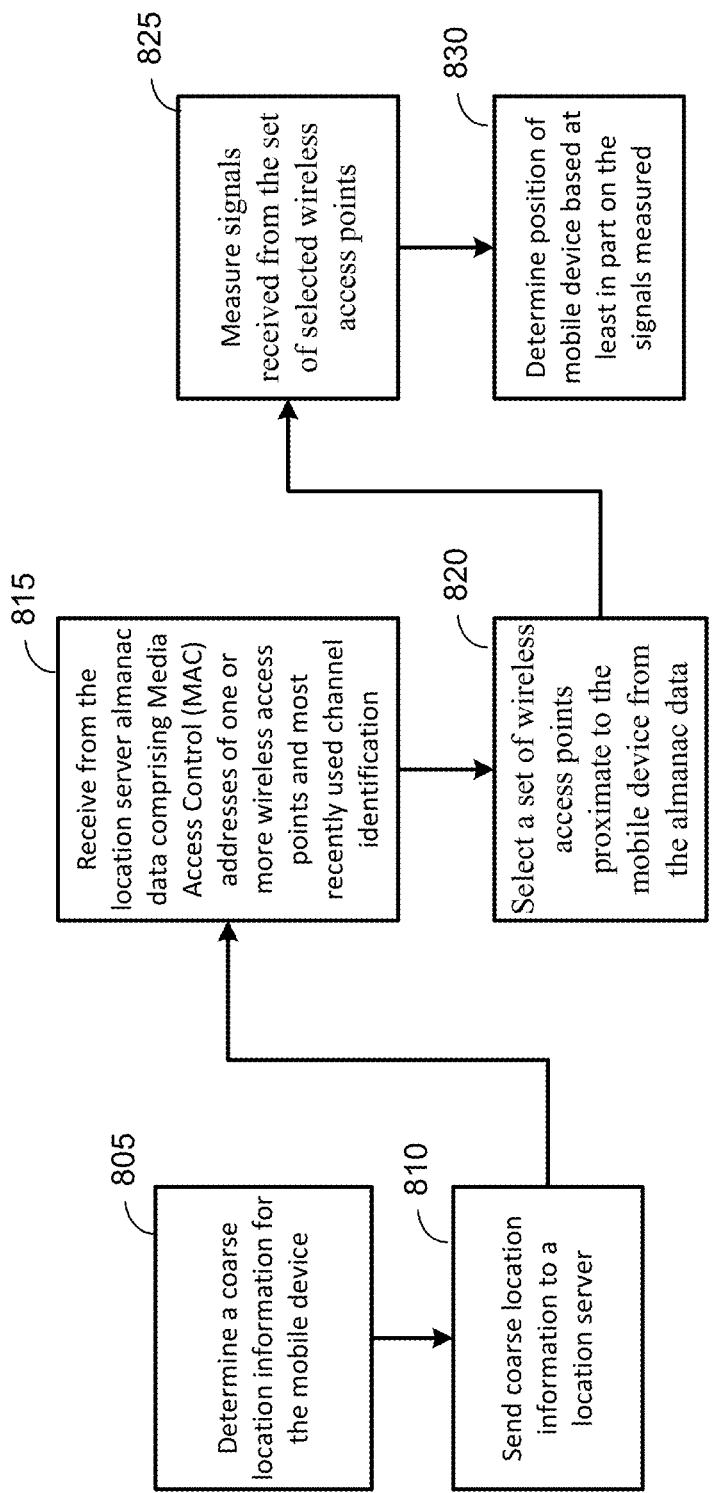
FIG. 8 is a flow diagram of a process for determining the position of a mobile device using the techniques discussed herein.

FIG. 8 is a flow diagram of a process for determining the position of a mobile device using the techniques discussed herein. The process illustrated in FIG. 8 can be implemented using the mobile device 120 illustrated in FIG. 1. The position determination module 362 of the mobile device 120 provides means for performing the various stages included in the process illustrated in FIG. 8 unless otherwise specified.

Coarse location information for the mobile device 120 can be determined (stage 805). The position determination module 362 of the mobile device 120 can be configured to determine coarse location information for the mobile device 120. The coarse location information of the mobile device 120 can include an approximate or estimated position of the mobile device 120 (also referred to herein as a "coarse location") and/or other information that can be used to determine an approximate location of the mobile device 120. For example, the other information that can be used to determine an estimated location of the mobile device 120 can include one or more cell IDs associated with wireless base stations, such as wireless base station 140. The wireless base station 140 can be macrocell base stations, picocell base stations, microcell base stations, and/or femtocell base stations. The other information that can be used to determine an estimated location of the mobile device 120 can include one or more MAC addresses associated with wireless terrestrial transmitters, such as the wireless access points 115. The coarse location of the mobile device 120 can be represented by a geographical area in which the actual location of the mobile device 120 is estimated to be. For example, the coarse location of the mobile device may be represented by the coverage area of a wireless access point 115 or wireless base station 140 from which the mobile device 120 has measured signals. An estimated size of a coverage area of a wireless access point 115 or wireless base station 140 may be known or may be estimated based on the type of wireless access point 115 or wireless base station 140, and the location of the wireless access point 115 or wireless base station 140 may be known. The coarse location of the mobile device 120 can then be derived from the estimated size of the coverage area and the location information for the wireless access point 115 or wireless base station 140.

The coarse location information for the mobile device can be determined in various ways. The coarse location of the mobile device can be determined by listening for signals from a wireless access point 115 or a base station 140 to obtain an identifier of the wireless access point 115 or the base station 140. This identifier can be used to determine a geographical coverage area of the wireless access point 115 or the base station 140. The identifier may be a unique identifier, such as a Media Access Control (MAC) address associated with the wireless access point 115 as indicated above, or may be another type of identifier associated with the transmitter that can be used to uniquely identify. The identifier may also be information that may be used in conjunction with other information to determine which wireless access point 115 or the base station 140 from which the signals were received. The coarse location information can be used to determine location information for the wireless access point 115 or a base station 140 from which signals have been received, and using that location information, determine an approximate location of the mobile device 120 based at least in part on the estimated coverage area of the wireless access point 115 or a base station 140 from which the signals have been received by the mobile device 120. The coarse location information can also include identifiers associated with more than one wireless access point 115 and/or base stations 140 where the mobile device 120 detects signals from more than one such device.

The coarse location information for the mobile device 120 can be sent to the location server 160 (stage 810). The position determination module 362 can be configured to send the coarse location information to the location server 160 via the wireless interface 225 of the mobile device. The coarse location information can then be routed to the location server 160 via one or more networks, such as network 110. The coarse location of the mobile device 120 can be sent to the location server 160 as part of a request almanac data that the mobile device 120 can use to determine the location of the mobile device.

Almanac data can be received from the location server 160 (stage 815). The almanac data can be received by the mobile device 120 in response to the mobile device 120 sending the coarse location information to the location server 160. The almanac data received from the location server 160 can include data that includes the MAC addresses of one or more wireless access point 115 or other information that be used to uniquely identify the wireless access points 115. The almanac data can also include recently used channel identified for the one or more wireless access points 115 included in the almanac data. The channel or channels on which a wireless access point 115 operates could change over time, but the recently used channel information can facilitate the mobile device 120 being able to quickly acquire and measure signals from a wireless access point if the mobile device 120 has information indicating on which channel the wireless access point 115 was last observed operating. The most recently used channel identification can include a number, a channel frequency, or a combination thereof. The almanac data provided by the location server may include one or more of the following in addition to or instead of the information discussed above: a frequency band or bands associated with the wireless access points 115, location information for the wireless access points 115, radio power output, antenna gain, or antenna type of the wireless access points 115. The mobile device 120 can be configured to use the channel and/or frequency band information to select which wireless access points 120 from which signals may be acquired without requiring the mobile device 120 to retune its receiver. The mobile device 120 can be configured to select wireless access points 115 that require no retuning of the receiver or minimizes the retuning of the receiver. The mobile device 115 can also be configured to use the radio power output, antenna gain, and/or antenna type of the wireless access points 115 to select wireless access points 115 that may provide a stronger signal that may be easier to acquire. Furthermore, the mobile device can be configured to use the location information associated with the wireless access points 115 to select wireless access points 115 that may be closest to the mobile device 120 and/or the signals from which may be subject to less multipath or other interference based on the location of the wireless access points 115 within the local environment and the coarse location of the mobile device 120.

The almanac data provided by the location server can include one or more bins. The almanac data may include a single bin associated with the coarse location of the mobile device 120 or more than one bin. The bins may include information identifying wireless access points 115 within a specific geographic area, and the bins may comprise information for overlapping geographic areas. The geographic areas may overlap, at least in part, which can facilitate determining whether the mobile device 120 is moving from a geographic area covered by a first bin and into a geographic area associated with a second overlapping bin based on the wireless access points 115 that are in range of the mobile device 120 such that the mobile device 120 can receive signals from these wireless access points 115.

The almanac data may also include multiple bins surrounding the location of the mobile device based on the identifiers of the wireless access points 115 and/or wireless base stations 140 included in the coarse location information provided by the mobile device 120. The location server 160 may determine that the mobile device 120 is located near the edge of a geographical area associated with a bin based on an identifier of a wireless access point 115 or wireless base station 140 included in the coarse location information and can select one or more bins proximate to a current bin in which the mobile device 120 may be located because the mobile device 120 may move out of the geographical area associated with the current bin and into a geographical area associated with another bin. If the wireless access points 115 from which the mobile device detects signals are associated with a bin other than the geographic area associated with the current bin or are associated with the current bin and another bin or bins, then multiple bins of almanac data can be provided to the mobile device 120 by the location server. The location server 160 can be configured to determine whether the mobile device 120 is located proximate to an edge of a bin based on multiple identifiers of wireless base station 115 and/or wireless base stations 140.

The location server 160 can also be configured to bin the almanac data based on channel information. The mobile device 120 can be configured to include channel information identifying a channel or channels on which the mobile device 120 detects signals from wireless access points 115 and/or wireless base stations 140 as part of the coarse location information provided to the location server 160. The location server 160 can also be configured to determine which channel or channels the wireless access points 115 and/or the wireless base stations 140 proximate to the mobile device 120 are configured to operate on based on the identifiers provided in the coarse location information provided by the mobile device 120. The location sever 120 can then provide one or more bins of almanac data to the mobile device 120 that includes wireless access points 115 and/or wireless base stations 140 that are configured to transmit on a same group of channel or channels. Grouping the information included in the bin by channel can facilitate the mobile device 120 in acquiring signals from the wireless access points 115 and/or wireless base stations 140 more quickly, because this technique can reduce the number of channels on which the mobile device 120 must listen for signals from wireless access points 115 and/or wireless base stations 140. The location server 160 can be configured to bin the almanac data based on the geographic location technique discussed above, the channel technique discussed above, or a combination thereof.

The almanac data can also include one or more MAC addresses associated with the wireless access points 115 and associated channel information. The almanac data can also include one or more virtual MAC addresses associated with the wireless access points 115 and associated channel information. Virtual MAC addresses can be used to provide virtual wireless access points (VAPs) or virtual local area networks (VLANs) which can be used to segment wireless traffic. A virtual MAC address can be associated with each of the segments and segments may be configured to operate on different channels. The almanac data can also include transceiver reliability metrics. The transceiver reliability metrics can include RSSI reliability and/or RTT reliability associated with the wireless access points 115 included in the almanac data. The transceiver reliability metrics are discussed in detail about with respect to the location server and the almanac data.

A set of wireless access points proximate to the mobile device can be selected from the almanac data (stage 820). The position determination module 362 of the mobile device 120 can be configured to select wireless access points 115 based on one or more of the following factors: last known channel information, reliability metrics, and geometry. The almanac data provided by the location server 160 can include last known channel information for the wireless access points 115 included therein, and the position determination module 362 of the mobile device 120 can be configured to select wireless access points 115 that share the same last known channel. By selecting wireless access points 115 known to have been operating on the same channel, the mobile device 120 can measure signals from those wireless access points 115 without having to switch between multiple channels. Switching between channels can be time consuming, and may delay the measurements of the signals that the position determination module 362 can used to determine the position of the mobile device 120. The position determination module 362 can also be configured to select multiple groups of wireless access points 115 where each of the wireless access points 115 in each group were last known to be operating on the same channel. The position determination module 362 can also be configured to use transceiver reliability metrics included in the almanac data provided by the location server 160. The transceiver reliability metrics can include RSSI and/or RTT reliability metrics for the wireless access points 115 included in the almanac data. The position determination module 362 can be configured to select wireless access points 115 associated with higher transceiver reliability metrics, which may result in more accurate signal measurements which can in turn increase the likelihood of the position determination module 362 arriving at a more accurate position estimate for the mobile device 120. The position determination module 362 can also be configured to select wireless access points 115 based on geometry. The position determination module 362 can be configured to select wireless access points 115 that are dispersed across a geographical area associated with the coarse location of the mobile device, where the geographical area represents an area in which the mobile device 120 may be located based on the coarse location information. The position determination module 362 can also be configured to select wireless access points 115 that are dispersed about an estimated center point of the geographical area associated with the coarse location of the mobile device 120. The position determination module 362 can also be configured to use other factors in addition to or instead of those discussed herein when selecting the wireless access points 115 from the almanac data.

Signals can be measured from the set of selected wireless access points (stage 825). The position determination module 362 of the mobile device can use the wireless interface 225 of the mobile device 120 to measure signals from the set of wireless access points selected in stage 820. The mobile device 120 can obtain one or more types of signal measurements, such as RTT and/or RSSI measurements. The position determination module 362 can also be configured to use other types of signal measurements, such as TOA and OTDOA measurements.

A position of the mobile device 120 can be determined based at least in part on the signals measured (stage 830). The mobile device 120 can be configured to determine a position of the mobile device 120 by triangulating the position of the mobile device 120 based on signals measured from the wireless access points that were selected. The positions of the wireless access points that were selected can be determined from the almanac data received from the location server 160, and the distance between the mobile device 120 and the selected wireless access points can be determined based on the signal measurements obtained in stage 825. The position determination module 362 can be configured to determine a position of the mobile device 120 by performing trilateration using the signal measurements obtained in stage 825. The position determination module 362 can also be configured to use one or more signals obtained from a GNSS satellite in combination with the signals obtained at stage 825 to determine the position of the mobile device 120. In some implementations, the signal information measured in stage 825 can be sent to the location server 160, and the location server 160 can be configured to determine the location of the mobile device and to return information identifying the location of the mobile device 120 to the mobile device 120.

The process illustrated in FIG. 8 may also include one or more optional stages not illustrated in the figure. For example, the process may include reporting information to the location server 160 indicating whether or not the mobile device 120 was able to measure signals for a particular wireless access point 115 included in the almanac data. Reporting information to the location server 160 may further comprise: identifying a subset of wireless access points from the set of wireless access points from which the mobile device was able to measure the signals, identifying active channels associated with the subset of wireless access points, and sending identifiers associated with the subset of wireless access points and active channels to the location server. The location server 160 can use this information to update the most recent channel information associated with wireless access points 115 included in the almanac data store. The process illustrated in FIG. 8 can also include the optional stage of determining a power status of the mobile device. The power status of the mobile device can represent an estimate of power remaining in a battery or other power supply of the mobile device 120 based on the current usage pattern of the mobile device 120. The process of FIG. 8 can also include a stage where the estimated of power remaining is compared to a threshold value and the stages 805-830 of the process illustrated in FIG. 8 can be executed responsive to the estimated of the power remaining being less than the threshold value. Thus, the mobile device 120 can be configured such that the process illustrated FIG. 8 is performed to determine a position of the mobile device 120 using almanac data rather than other techniques that may consume more power, such as the mobile device 120 conducting discovery scans to identify wireless access points 115 proximate to the mobile device 120 the signals of which can be measured to determine a position of the mobile device 120. Furthermore, stage 820, in which the set of wireless access point 115 proximate to the mobile device are selected, can include selecting only wireless access points 115 proximate to the mobile device 120 that were operating on the same last known channel according to the almanac data. The mobile device 120 can be configured to wireless access points 115 that were operating on the same last known channel in order to facilitate measuring of signals from the wireless access points 115 that were selected. The position determination module 362 of the mobile device 120 would not have to instruct the wireless interface 225 of the mobile device 120 to switch between frequencies in order to measure signals from the each of the wireless access points 115 that were selected.

Figure 9:
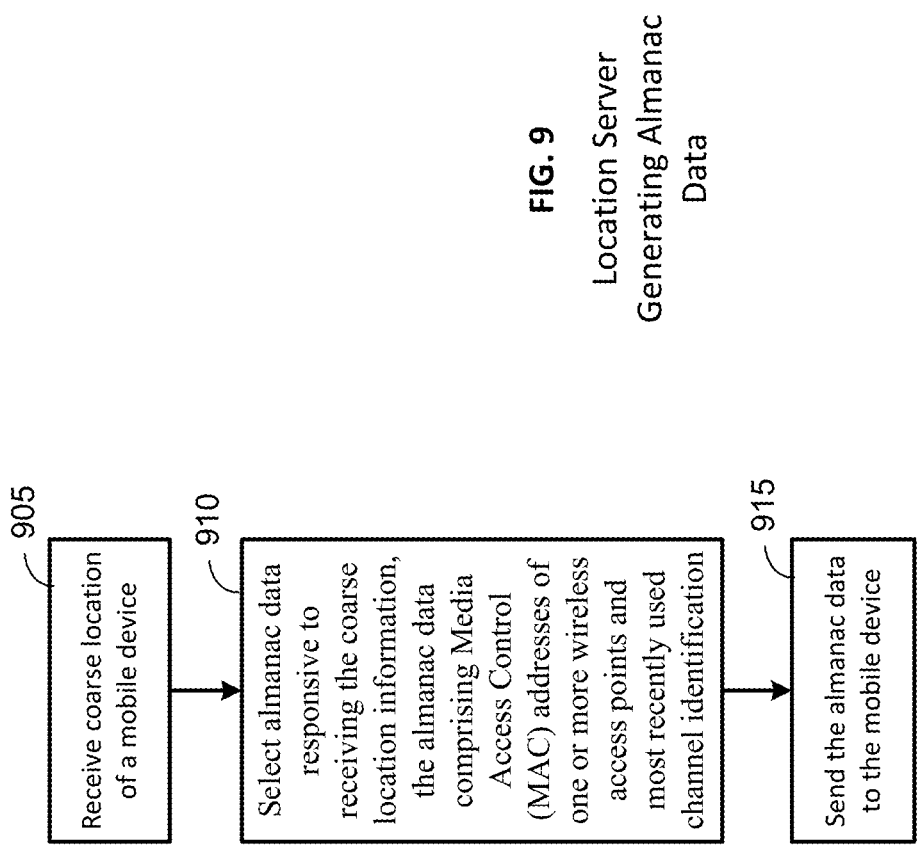
FIG. 9 is a flow diagram of a process for providing almanac data to a mobile device according to the techniques discussed herein.

FIG. 9 is a flow diagram of a process for providing almanac data to a mobile device according to the techniques discussed herein. The process illustrated in FIG. 9 can be implemented using the location server 160 illustrated in FIG. 1. The almanac data module 766 of the location server 160 provides means for performing the various stages included in the process illustrated in FIG. 9 unless otherwise specified.

A course location of the mobile device 120 can be received (stage 905). The location server 160 can receive a request for almanac data from the mobile device 120 that includes coarse location information of the mobile device 120 from the mobile device 120. The coarse location information can include information that can be used to determine an approximate location of the mobile device 120. For example, the coarse location information can include an identifier of the wireless access point 115 or the base station 140 proximate to the mobile device 120. The identifier can be used to determine a geographical coverage are of the wireless access point 115 or the base station 140, and thereby determine a geographical area in which the mobile device 120 may be located. The identifier may be a unique identifier, such as a Media Access Control (MAC) address associated with the wireless access point 115. The identifier may also be information that may be used in conjunction with other information to determine which wireless access point 115 or the base station 140 is referenced by the coarse location information.

Almanac data can be selected based on the coarse location of the mobile device 120 (stage 910). The almanac data store maintained by the location server 160 may contain a very large amount of information associated with a large number of wireless access points 115. Due to bandwidth constraints of the network 110, processing constraints of the mobile device 120 and the location server 160, and data storage constraints on the memory 260 of the mobile device 120, it would not be practical for the location server 160 to send all of the almanac data in the almanac data store to the mobile device 120. Accordingly, the almanac data module 766 of the location server 160 can be configured to select a subset of the almanac data from the almanac data store to be sent to the mobile device 120. The almanac data module 766 can be configured to take into account data density and/or geometry into account when selecting the wireless access points 115 to include in the subset of the almanac data to be sent to the mobile device 120. As discussed above, the almanac data module 766 can be configured to select just a portion of the wireless access points 115 for a particular geographical area where data density is higher. The almanac data module 766 can be configured to select the subset of the available wireless access points 115 based on geometry and/or based on transceiver reliability metrics associated with the wireless access points 115. The almanac data module 766 can be configured to select wireless access points 115 from the available wireless access points 115 based on geometry. The almanac data module 766 can be configured to select wireless access points 115 to include in the subset of almanac data to be provided to the mobile device 120 that are dispersed across a geographical area associated with the coarse location provided by the mobile device, where the geographical area represents an area in which the mobile device 120 may be located based on the coarse location information provided by the mobile device 120. The almanac data module 766 can also be configured to select wireless access points 115 to include in the subset of almanac data to be provided to the mobile device 120 that are dispersed about an estimated center point of the geographical area associated with the coarse location provided by the mobile device. The almanac data module 766 can also be configured to take into consideration other factors when determining how many wireless access points 115 for which information is to be include in the subset of almanac data to be provided to the mobile device, such as available network bandwidth between the location server 160 and the mobile device 120, mobile device 120 memory storage capacity and processing capacity, and/or other factors that may influence how much data can be transferred to the mobile device 120 and/or the mobile device 120 is capable of utilizing.

As discussed above with respect to stage 815 of the process illustrated in FIG. 8, the almanac data provided by the location server 160 can be binned by geographic location, channel information, or a combination thereof. The location server can select a bin or bins of almanac data to be provided to the mobile device 120 based on the coarse location information provided by the mobile device 120, which may include the identifiers of one or more wireless access points 115 and/or one or more wireless base stations 140 proximate to the mobile device 120. The coarse location information can also include channel information identifying channels on which signals from the one or more wireless access points 115 and/or one or more wireless base stations 140 proximate to the mobile device 120 were detected by the mobile device 120. The location server 160 can also be configured to obtain channel information for the wireless access points 115 and/or wireless base stations 140 and use that information to assist to determine which bin or bins of almanac data to provide to the mobile device 120.

The almanac data that was selected can be transmitted to the mobile device 120 (stage 915). The almanac data module 766 of the location server 160 can be configured to send the almanac data to the mobile device 120 through the network 110 via the network interface 665. The almanac data can include subset of the almanac data stored in the almanac data store that has been selected based on the coarse location of the mobile device 120 and/or the other criteria discussed above. The almanac data may include recently used channel information that includes a channel number, a channel frequency, or a combination thereof for each of the wireless access points 115 included in the almanac data. The almanac data may also include MAC addresses and associated channel identification information. The almanac data may also include virtual MAC addresses and associated channel identification information for the virtual MAC addresses if any of the wireless access points 115 included in the almanac data are virtual wireless access points. The almanac data can also include transceiver reliability metrics associated with the wireless access points 115. The transceiver metrics can include RSSI reliability metrics and/or RTT reliability metrics associated with the wireless access points. The mobile device 120 can use the reliability metrics to determine whether to use a particular wireless access point 115 included in the almanac data for position determination.

Figures 10, 11:
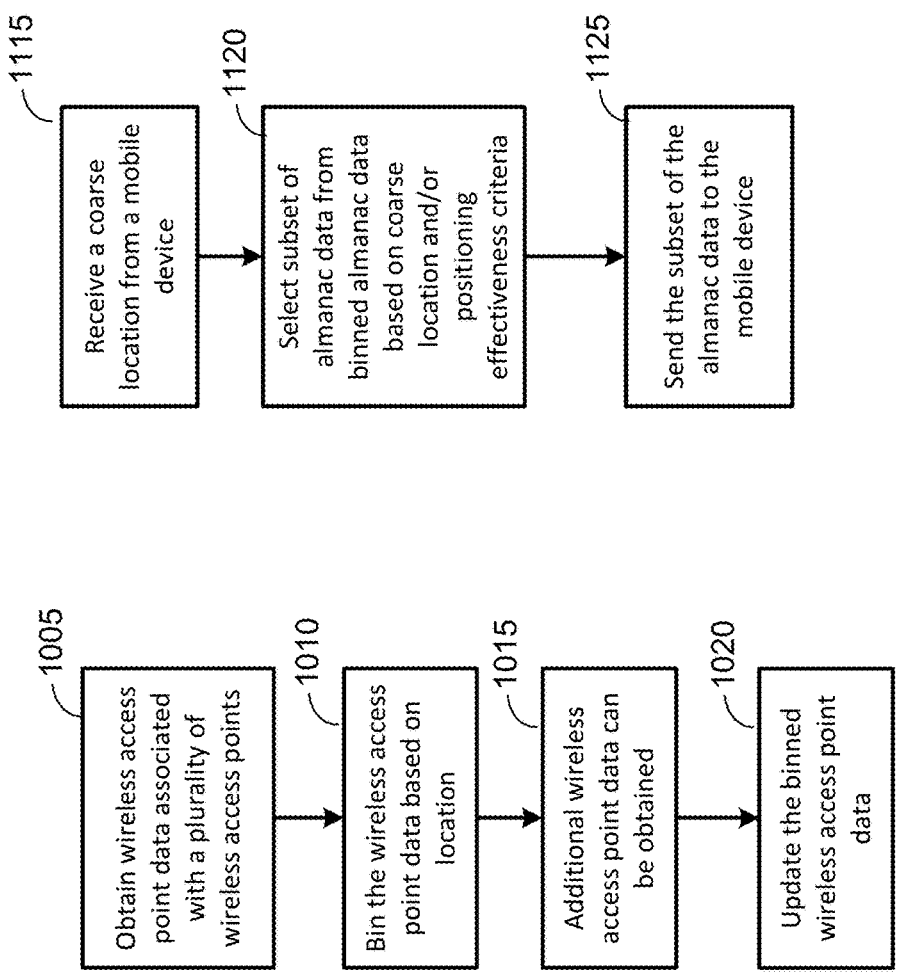
FIG. 10 is a flow diagram of a process that can be used to organize and update almanac data according to the techniques discussed herein.
FIG. 11 is a flow diagram of a process for selecting almanac data for a mobile device from the almanac data store maintained by the location server according to the techniques disclosed herein.

FIG. 10 is a flow diagram of a process that can be used to organize and update almanac data according to the techniques discussed herein. The process illustrated in FIG. 10 can be used to update and/or organize the information in the almanac data store maintained by the location server 160. The process illustrated in FIG. 10 can be used to update the almanac data store using information received from mobile devices 120, from wireless access points 115, and/or from other sources. The almanac data module 766 of the location server 160 provides means for performing the various stages included in the process illustrated in FIG. 10 unless otherwise specified. The almanac data and the binning techniques discussed in the process of FIG. 10 can be used to organize the almanac information that can be provided to the mobile device 120 in the other processes discussed herein.

Wireless access point data associated with a plurality of wireless access points 115 can be obtained (stage 1005). The wireless access point data can include information that identifies each wireless access points 115 included in the wireless access point data. The wireless access point data can also include a channel number, a channel frequency, or a combination thereof for each of the wireless access points 115 included in the wireless access point data. The channel number and/or channel frequency information can be used to facilitate the acquisition of signals from the wireless access points 115 by a mobile device 120 attempting to use signals from the wireless access points 115 to determine the position of the mobile device 120. The wireless access point data can be obtained from one or more sources. For example, the wireless access point data can be obtained by one or more network service providers that maintain such information about wireless access points 115 that are part of a wireless network or can provide wireless connectivity to a mobile device associated with the wireless network. For example, the wireless access point data can be received via a crowd-sourcing technique in which mobile devices 120 collect information about wireless access points proximate to the mobile device and send the wireless access point data to the location server 160. The wireless access point data can also be received from mobile devices 120 and/or wireless access points 115 in response to scan requests from the discovery scan module 764 of the location server 160. The mobile devices 120 and/or wireless access points 115 receiving a scan request from the location server 160 can be configured to perform either an active or passive scan in response to the scan request and to sends the results of the scan to the location server 160. The scan request can specify whether an active or passive scan is being requested. The mobile devices 120 and/or wireless access points 115 receiving such requests can be configured to perform the requested type of scan or be configured to select the particular scan type to be performed (e.g., based on available resources at the receiving device at the time that the scan request is received). The wireless access points 115 can also be configured to conduct a scan and to send the results to the location server 160. For example, the wireless access points 115 can be configured to conduct a scan when they are booted up to identify wireless access points 115 proximate to the wireless access point 115 conducting the scan and to send the scan results to the location server 160. The wireless access points 115 can also be configured to periodically conduct scans and to send the scan results to the location server 160.

The wireless access point data can be binned based on location and stored as binned almanac data (stage 1010). The term "binning" as used herein can refer to grouping the wireless access points 115 by a geographic location associated with a position associated with each of the wireless access points. A "bin" or grouping of wireless may encompass various-sized logical groupings of wireless access points 115 based on a geographical area or a portion thereof associated with the wireless access points 115. For example, a bin may be defined for a particular venue, such as an airport, a shopping mall, a stadium, a university campus, or other type of venue. A bin may also be defined for part of venue. A multistory venue may, for example, be divided into separate bins for each floor of the venue. Wireless access points 115 within a venue may also be divided in into other logical groupings, such as by separate terminals of an airport or by separate wings of a convention center. Other logical groupings of wireless access points 115 could be provided, such as by town, by city block, by post code or a portion thereof. The size of the bins can also be determined at least in part based on data density. For example, in areas that include a larger number of wireless access points 115, the size of the bins derived for that area may be smaller (include less wireless access points 115) and may cover a relatively smaller geographical area than bins associated with areas that include a smaller number of wireless access points 115. The size of the bins can be kept smaller in areas where there is a higher density of wireless access points 115 disposed throughout an area in order to reduce the amount of data that is to be transmitted to the mobile device 120, thereby reducing the impact on network resources and resources at the location server 160 and the mobile device 120 ultimately receiving the almanac data. The bins may also represent geographic areas that overlap, at least in part, such that one or more wireless access points 115 and/or one or more wireless base stations 140 included in a first bin may also be included in one or more other bins having overlapping geographical areas in which the locations of the one or more wireless access points 115 and/or one or more wireless base stations 140 are located. The almanac data provided by the location server may include one or more of the following in addition to or instead of the information discussed above: a frequency band or bands associated with the wireless access points 115, location information for the wireless access points 115, radio power output, antenna gain, or antenna type of the wireless access points 115.

The wireless access point data received for a particular wireless access point 115 can include geographical coordinates associated with a last known position of the wireless access point 115. The wireless access points 115 may have a fixed location, or at least are not likely to be moved very frequently, so the location known location information should generally reflect the current location of the wireless access point 115. The almanac data module 766 can be configured to add the wireless access points 115 to an existing bin based on the geographical coordinates associated with the wireless access points 115. The almanac data module 766 can also be configured to generate a new set of bins as wireless access point data is received by the location server 160 and to associate wireless access points 115 in the almanac data store with the newly generated bins. The new set of bins may be generated based on changes in data density resulting from changes in the number of wireless access points 115 present in a particular geographical area.

The location server 160 can also be configured to include a user interface that allows a user to define bins for particular geographic areas and/or venues and to associate wireless access points 115 with the bins. The location server 160 can be configured to associate wireless access point data received from wireless access points 115 and/or mobile devices 120 with theses user defined bins and to create new bins for wireless access points 115 that are associated with geographical locations that fall outside of the geographical area associated with the user defined bins.

The almanac data module 766 of the location server 160 can be configured to bin data based on channel information associated the wireless access points 115 and/or wireless base stations 140. The almanac data module 766 can be configured to group wireless access points 115 and/or wireless base stations 140 operating on a same channel or group of channels into a bin. The almanac data can also include recently used channel identified for the one or more wireless access points 115 included in the almanac data. The channel or channels on which a wireless access point 115 operates could change over time, but the recently used channel information can facilitate the mobile device 120 being able to quickly acquire and measure signals from a wireless access point if the mobile device 120 has information indicating on which channel the wireless access point 115 was last observed operating. The most recently used channel identification can include a number, a channel frequency, or a combination thereof. The almanac data module 766 can update the channel information associated with a wireless access point 115 and/or wireless base station 140 as update channel information is acquired. The coarse location information obtained by the mobile devices 120 and provided to the location server 160 can include channel information, which can be used to update the channel information maintained by the location server 160 and can be used to redetermine bin allocations for wireless access points 115 and/or macrocell base stations 140 as these devices change the channels on which they are determined to be operating. The location server 160 can also be configured to receive updated channel information from the wireless access points 115 and/or macrocell base stations 140 as well. The wireless access points 115 and/or macrocell base stations 140 can be configured to report changes in operating channels to the location server 160. The almanac data module 766 can be configured such that any changes to the operating channels can trigger the almanac data module 766 to reallocate wireless access points 115 and/or macrocell base stations 140 to different bins. The almanac data module 766 can also be configured to create bins based on frequency band on which the wireless access points 115 and/or the wireless base stations 140 can be configured to operate.

The almanac data module 766 of the location server 160 can be configured to create sub-bins within the geographic areas based on the channels as discussed above or may be configured to create bins based on channel information that may not cover the same geographic areas as those discussed above. The geographic areas associated with the channel information may change over time as the wireless access points 115 and/or wireless base stations 140 within a particular geographic area select an operating channel or operating channels based on changing network and environmental conditions.

Additional wireless access point data can be obtained (stage 1015). Stage 1015 is optional and may not occur. Additional wireless access point data can be received from one or more mobile devices 120 and/or wireless access points 115 once the almanac data has been binned. For example, additional wireless access point data can be received from one or more mobile devices 120 and/or wireless access points 115 in response to the scan requests from the discovery scan module 764 of the location server 160 and/or from other sources.

The binned wireless access point data in the almanac data can be updated (stage 1020). Stage 1020 is optional and may be performed in response to additional wireless access point data being received. The almanac data module 766 can be configured to update the binned almanac data in response to receiving additional information from the mobile devices 120 and/or wireless access points 115. The information received from the mobile devices 120 and/or wireless access points 115 may indicate that one or more wireless access points 115 may be operating on additional or different channels and/or may have been moved to a new location. The almanac data module 766 can be configured to update existing bins of almanac data based on the additional information that may be received. For example, if a particular wireless access point 115 has been determined to have moved based on information received at the location server 160, the almanac data module 766 can be configured to update the almanac information to associate each wireless access point 115 that has been determined to have moved with a bin associated with the geographic area to which the wireless access point 115 has been determined to have related.

FIG. 11 is a flow diagram of a process for selecting almanac data from the almanac data store maintained by the location server 160 for a mobile device 120. The almanac data module 766 of the location server 160 provides means for performing the various stages included in the process illustrated in FIG. 11 unless otherwise specified. The process illustrated in FIG. 11 can be performed by the location server 160 after the process illustrated in FIG. 10.

A coarse location can be received from a mobile device 120 (stage 1115). The mobile device 120 can send a coarse location to the location server 160. The location server 160 can also receive a request for almanac data from the mobile device 120 that includes coarse location information of the mobile device 120 from the mobile device 120. The coarse location information can include information that can be used to determine an approximate location of the mobile device 120. For example, the coarse location information can include an identifier of the wireless access point 115 or the base station 140 proximate to the mobile device 120. The identifier can be used to determine a geographical coverage are of the wireless access point 115 or the base station 140, and thereby determine a geographical area in which the mobile device 120 may be located. The identifier may be a unique identifier, such as a Media Access Control (MAC) address associated with the wireless access point 115. The identifier may also be information that may be used in conjunction with other information to determine which wireless access point 115 or the base station 140 is referenced by the coarse location information. A subset of wireless almanac data from the binned almanac data can be selected based on the coarse location of the mobile device 120, and optionally, positioning effectiveness criteria (stage 1120). The almanac data module 766 of the location server 160 can be configured to identify bin or bins associated with the coarse location of the mobile device 120 and provide almanac data associated with the wireless access points 115 associated with those bins to the mobile device 120. The almanac data module 766 can be configured to select more than one bin if the coarse location of the mobile device is within a threshold distance of a geographical location associated with more than one bin.

As discussed above, the almanac data provided by the almanac data module 766 of the location server 160 can be binned by geographic location, channel information, or a combination thereof. The location server can select a bin or bins of almanac data to be provided to the mobile device 120 based on the coarse location information provided by the mobile device 120, which may include the identifiers of one or more wireless access points 115 and/or one or more wireless base stations 140 proximate to the mobile device 120. The coarse location information can also include channel information identifying channels on which signals from the one or more wireless access points 115 and/or one or more wireless base stations 140 proximate to the mobile device 120 were detected by the mobile device 120. The location server 160 can also be configured to obtain channel information for the wireless access points 115 and/or wireless base stations 140 and use that information to assist to determine which bin or bins of almanac data to provide to the mobile device 120.

The almanac data module 766 can also be configured to select a subset of wireless access points 115 that is less than the total number of wireless access points associated with the bin or bins selected based on the coarse location of the mobile device 120. For example, the almanac data module 766 can be configured to take into account positioning effectiveness criteria when selecting the subset of wireless access points 115 to include in the almanac data to be provided to the mobile device 120. The almanac data module 766 of the location server can used the positioning effectiveness criteria to rank the wireless access points 115 associated with a particular bin and to select a subset of wireless access points 115 having the highest rankings for the bin. The almanac data module 766 can also be configured to assign a value to each of the positioning effectiveness criteria associated with the wireless access points 115 and to only select a respective wireless access point 115 for inclusion in the almanac data to be sent to the mobile device 120 if the sum of the values associated with the positioning effectiveness criteria associated with the respective wireless access point 115. The positioning effectiveness criteria can include channel identification information and/or signal reliability metrics. The channel identification information associated with a particular wireless access point 115 can be based on the last known channel on which that wireless access point 115 was observed operating. The almanac data module 766 can be configured to select a subset of wireless access points 115 operating on a same channel if available. For example, the almanac data module 766 can be configured to associate a larger weight or value with wireless access points 115 of a group of wireless access points 115 operating on a same last known channel. Selecting a group of wireless access points 115 that are transmitting on the same channel can assist the mobile device 120 receiving the almanac data from the location server 160 more quickly acquire signal measurements from the wireless access points 115, because the mobile device 120 will not have to switch frequency bands and/or channels in order to acquire signal measurements from the subset of wireless access points 115.

The signal reliability metrics can provide an indication of how reliable a particular wireless access point 115 may be should signal measurements from that wireless access point 115 be used to position determination by the mobile device 120. The signal reliability metrics can include RSSI reliability metrics and/or RTT reliability metrics. The reliability of RSSI signal measurements can be affected by the type of environment in which a wireless access point 115 is located. For example, structural components of the environment, such as walls, columns, beams, and other such components proximate to wireless access point 115 can impact RSSI measurements of signals transmitted by that wireless access point 115. Other objects, such as furniture, machinery, and other objects disposed throughout the area around a wireless access point 115 can also impact RSSI measurements of signals transmitted by that wireless access point 115. The RSSI measurements obtained from wireless access point 115 could vary greatly depending upon where the mobile device 120 is positioned relative to the wireless access point 115 and which structural components or other objects are between the mobile device 120 and the wireless access point 115. Wireless access points in certain types of located near structural components proximate to structural components that may interfere with the reliability of RSSI measurements can be identified by the almanac data module 766 of the location server 160 based on map data of an indoor environment, where available. The almanac data module 766 of the location server 160 can also be configured to use crowd-sourced information reported by mobile devices 120 and/or by wireless access points 115 performing discovery scans to identify wireless access points whose RSSI and/or RTT measurements are unreliable. The almanac data module 766 of the location server 160 can associate a lower signal reliability score to a wireless access point 115 proximate to structural components or objects that are likely to interfere with RSSI measurements. For example, the location server 160 and/or the mobile device 120 can be configured to determine whether any obstructions may be present between the mobile device 120 and a particular wireless access point 115 based on map and/or structural information for the environment in which the mobile device 120 is located. Obstructions in the line-of-sight (LOS) path between the wireless access point 115 and the mobile device 120 can interfere with the accuracy of the RSSI measurements.

The almanac data module 766 can be configured to consider only signal reliability metrics or channel identification information, or a combination thereof when determining which wireless access points 115 to include in the almanac data to send to the mobile device 120 based on the positioning effectiveness criteria. The almanac data module 766 can be configured to weight the signal reliability metrics equally with the channel identification information or can be configured to associate a higher weight with the signal reliability metrics or the channel identification information. For example, the almanac data module 766 can be configured to assign a higher weight to signal reliability metrics than channel identification information, so that the almanac data module 766 selects wireless access points associated with higher signal reliability metrics over wireless access points that are known to have been transmitting on the same channel.

The mobile device 120 can also be configured to take into account the positioning effectiveness criteria, which may be included with the almanac data received from the location server 160. For example, the position determination module 362 can be configured to receive almanac data from the location server 160 that is associated with positioning effectiveness criteria. The position determination module 362 of the mobile device 120 can be configured to select a subset of the wireless access points 115 that the position determination module 362 will make use of for determining the position of the mobile device 120. The position determination module 362 can make use of the positioning effectiveness criteria to select the wireless access points 115 using techniques similar to those discussed above with respect to the almanac data module 766 of the location server 160.

With respect to RTT measurements, lack of SIFS (Short Interframe Space) consistency and/or lack of fine timing measurement schemes being implemented by the wireless access point 115 are factors that can affect the accuracy of the RTT measurements for a particular wireless access point 115. The reliability of RTT measurements can be determined based on Short Interframe Space (SIFS) consistency for a particular wireless access point 115. SIFS is a time interval utilized by some implementations of wireless LANs. The SIFS interval is used by wireless devices that need to transmit highest priority transmissions to have access to the radio link before other wireless devices that need to transmit lower priority messages. For example, acknowledgements (ACK) and Clear to Send (CTS) messages may be assigned highest priority, and devices needing to transmit such messages can be configured to wait for the SIFS interval to elapse since a previous transmission on the radio link completed before proceeding to transmit the high priority message. Other wireless devices having lower priority message can be configured to wait for a longer interval before proceeding to transmit. The SIFS for a particular wireless access point 115 can be measured over time to determine whether a particular wireless access point 115 performs consistently. The SIFS should not vary greatly for a particular wireless access point 115. For example, the SIFS should typically not vary by more than a few nanoseconds for a wireless access point 115. The SIFS associated with a particular wireless access point 115 can be measured by sending a series packet to the wireless access point 115 and measuring the SIFS. If the SIFS varies by more than a threshold amount, the wireless access point 115 can be identified as unreliable or may be associated with a lower reliability score than a wireless access point 115 for which the SIFS is more consistent.

The almanac data module 766 can be configured to select wireless access points associated with signal reliability metrics when selecting from the wireless access points 115 associated with the bins selected based on the coarse location of the mobile device. The almanac data module 766 can be configured to select wireless access points having signal reliability metrics that meet or exceed a predetermined threshold. The almanac data module 766 can also be configured to provide all of the wireless access points 115 associated with the selected bins where the data density associated with the selected bins is low. For example, if the number of wireless access points 115 associated with the selected bin or bins is less than a threshold number of wireless access points 115, the almanac data module 766 can be configured to include all of the available wireless access points 115 in the almanac data to be provided to the mobile device 120.

Almanac data can be sent to the mobile device 120 comprising information associated with subset of wireless access points 115 selected (stage 1125). The almanac data module 766 of the location server 160 can be configured to send the almanac data to the mobile device 120 through the network 110 via the network interface 665. The almanac data can include subset of the almanac data stored in the almanac data store that has been selected based on the coarse location of the mobile device 120 and/or the other criteria discussed above. The almanac data may include recently used channel information that includes a channel number, a channel frequency, or a combination thereof for each of the wireless access points 115 included in the almanac data. The almanac data can also include MAC addresses of the wireless access points 115 and associated channel information. The almanac data may also include virtual MAC addresses and associated channel identification information for the virtual MAC addresses if any of the wireless access points 115 included in the almanac data are virtual wireless access points. The almanac data can also include transceiver reliability metrics associated with the wireless access points 115. The transceiver metrics can include RSSI reliability metrics and/or RTT reliability metrics associated with the wireless access points. The mobile device 120 can use the reliability metrics to determine whether to use a particular wireless access point 115 included in the almanac data for position determination.

Some example claims according to the disclosure provided herein include the following.

1. A mobile device according to the disclosure includes:
   means for determining a coarse location information for the mobile device;
   means for sending the coarse location information for the mobile device to a location server;
   means for receiving, from the location server, almanac data responsive to the coarse location information, the almanac data comprising Media Access Control (MAC) addresses of one or more wireless access points and most recently used channel identification;

means for selecting a set of wireless access points proximate to the mobile device from the almanac data;

means for measuring signals received from the set of selected wireless access points; and means for determining the position of the mobile device based at least in part on the signals measured.

2. The mobile device of claim 1, wherein the most recently used channel identification comprises a channel number, a channel frequency, or a combination thereof.

3. The mobile device of claim 1, wherein the almanac data further comprises MAC addresses and associated channel identification.

4. The mobile device of claim 1, wherein the almanac data further comprises transceiver reliability metrics.

5. The mobile device of claim 4, wherein the transceiver reliability metrics comprise RSSI reliability metrics.

6. The mobile device of claim 4, wherein the transceiver reliability metrics comprise RTT reliability metrics.

7. The mobile device of claim 1, further comprising:

means for identifying a subset of wireless access points from the set of wireless access points from which the mobile device was able to measure the signals;

means for identifying active channels associated with the subset of wireless access points on which the subset of wireless access points were transmitting at a time that the signals were measured; and means for sending identifiers associated with the subset of wireless access points and active channels to the location server.

8. The mobile device of claim 1, further comprising:

means for determining a power status of the mobile device indicating whether power consumption of the mobile device is currently constrained.

9. The mobile device of claim 8, further comprising the following means responsive to the power status of the mobile device currently being unconstrained:

means for performing a scan for wireless access points proximate to the mobile device;

means for measuring signals received from the wireless access points detected during the scan; and means for determining the position of the mobile device based at least in part on the signals measured from the wireless access points detected during the scan.

10. The mobile device of claim 1, wherein the means for selecting the set of wireless access points proximate to the mobile device from the almanac data comprises means for selecting wireless access points operating on a same channel.

11. A non-transitory, computer-readable medium, having stored thereon computer-readable instructions for determining a position of a mobile device, comprising instructions configured to cause a computer to:

determine coarse location information for the mobile device;

send the coarse location information for the mobile device to a location server;

receive, from the location server, almanac data responsive to the coarse location information, the almanac data comprising Media Access Control (MAC) addresses of one or more wireless access points and most recently used channel identification;

select a set of wireless access points proximate to the mobile device from the almanac data;

measure signals received from the set of selected wireless access points; and determine the position of the mobile device based at least in part on the signals measured.

12. The non-transitory, computer-readable medium of claim 11, wherein the most recently used channel identification comprises a channel number, a channel frequency, or a combination thereof.

13. The non-transitory, computer-readable medium of claim 11, wherein the almanac data further comprises MAC addresses and associated channel identification.

14. The non-transitory, computer-readable medium of claim 11, wherein the almanac data further comprises transceiver reliability metrics.

15. The non-transitory, computer-readable medium of claim 14, wherein the transceiver reliability metrics comprise RSSI reliability metrics.

16. The non-transitory, computer-readable medium of claim 14, wherein the transceiver reliability metrics comprise RTT reliability metrics.

17. The non-transitory, computer-readable medium of claim 11, further comprising instructions configured to cause the computer to:

identify a subset of wireless access points from the set of wireless access points from which the mobile device was able to measure the signals;

identify active channels associated with the subset of wireless access points on which the subset of wireless access points were transmitting at a time that the signals received from the set of selected wireless access points were measured; and send identifiers associated with the subset of wireless access points and active channels to the location server.

18. The non-transitory, computer-readable medium of claim 11, further comprising instructions configured to cause the computer to:

determine a power status of the mobile device.

19. The non-transitory, computer-readable medium of claim 18, further comprising instructions configured to cause the computer to perform the following responsive to the power status of the mobile device exceeding a predetermined threshold:

perform a scan for wireless access points proximate to the mobile device;

measure signals received from the wireless access points detected during the scan; and determine the position of the mobile device based at least in part on the signals measured from the wireless access points detected during the scan.

20. The non-transitory, computer-readable medium of claim 11, wherein the processor being configured to select the set of wireless access points proximate to the mobile device from the almanac data is further configured to select wireless access points operating on a same channel.

21. An apparatus for providing almanac data to a mobile device, the apparatus comprising:

means for receiving coarse location information from the mobile device;

means for selecting almanac data responsive to receiving the coarse location information, the almanac data comprising Media Access Control (MAC) addresses of one or more wireless access points and most recently used channel identification; and means for sending the almanac data selected to the mobile device.

22. The apparatus of claim 21, wherein the most recently used channel identification comprises a channel number, a channel frequency, or a combination thereof.

23. The apparatus of claim 21, wherein the almanac data further comprises virtual MAC addresses and associated channel identification.

24. The apparatus of claim 21, wherein the almanac data further comprises transceiver reliability metrics.

25. The apparatus of claim 24, wherein the transceiver reliability metrics comprise RSSI reliability metrics.

26. The apparatus of claim 24, wherein the transceiver reliability metrics comprise of RTT reliability metrics.

27. A apparatus for providing almanac data to a mobile device, the method comprising:
receiving coarse location information from the mobile device;
selecting almanac data responsive to receiving the coarse location information, the almanac data comprising Media Access Control (MAC) addresses of one or more wireless access points and most recently used channel identification; and
sending the almanac data selected to the mobile device.

28. The method of claim 27, wherein the most recently used channel identification comprises a channel number, a channel frequency, or a combination thereof.

29. The method of claim 27, wherein the almanac data further comprises virtual MAC addresses and associated channel identification.

30. The method of claim 27, wherein the almanac data further comprises transceiver reliability metrics.

31. The method of claim 30, wherein the transceiver reliability metrics comprise RSSI reliability metrics.

32. The method of claim 30, wherein the transceiver reliability metrics comprise of RTT reliability metrics.

33. A non-transitory, computer-readable medium, having stored thereon computer-readable instructions for determining a position of a mobile device, comprising instructions configured to cause a computer to:
a tangible, non-transitory computer-readable memory;
a transceiver configured to receive coarse location information from the mobile device;
a processor connected to the tangible, non-transitory computer-readable memory and configured to select almanac data responsive to receiving the coarse location information, the almanac data comprising Media Access Control (MAC) addresses of one or more wireless access points and most recently used channel identification; and
the transceiver being configured to send the almanac data selected to the mobile device.

34. The method of claim 33, wherein the most recently used channel identification comprises a channel number, a channel frequency, or a combination thereof.

35. The method of claim 33, wherein the almanac data further comprises virtual MAC addresses and associated channel identification.

36. The method of claim 33, wherein the almanac data further comprises transceiver reliability metrics.

37. The method of claim 36, wherein the transceiver reliability metrics comprise RSSI reliability metrics.

38. The method of claim 36, wherein the transceiver reliability metrics comprise of RTT reliability metrics.

39. An apparatus for providing almanac data to a mobile device, the apparatus comprising:
means for obtaining wireless access point data associated with a plurality of wireless access points;
means for binning the wireless access point data based on location to generate binned almanac data, the binned almanac data comprising Media Access Control (MAC) addresses of one or more wireless access points, most recently used channel identification, and positioning effectiveness criteria.

40. The apparatus of claim 39, further comprising:
means for receiving a coarse location from the mobile device;
means for selecting a subset of almanac data from the binned almanac data based on the coarse location of the mobile device; and
means for sending the subset of almanac data to the mobile device.

41. The apparatus of claim 40, wherein the means for selecting the subset of almanac data from the binned almanac data based on the coarse location of the mobile device further comprises means for selecting the subset of almanac data based at least in part on the coarse location of the mobile device and on the positioning effectiveness criteria.

42. The apparatus of claim 41, wherein the positioning effectiveness criteria comprise signal reliability metrics, channel identification information, or a combination of signal reliability metrics and channel identification information.

43. A non-transitory, computer-readable medium, having stored thereon computer-readable instructions for providing almanac data to a mobile device, comprising instructions configured to cause a computer to:
obtain wireless access point data associated with a plurality of wireless access points;
bin the wireless access point data based on location to generate binned almanac data, the binned almanac data comprising Media Access Control (MAC) addresses of one or more wireless access points, most recently used channel identification, and positioning effectiveness criteria.

44. The non-transitory, computer-readable medium of claim 43, further comprising instructions configured to cause the computer to:
receive a coarse location from the mobile device;
select a subset of almanac data from the binned almanac data based on the coarse location of the mobile device; and
send the subset of almanac data to the mobile device.

45. The non-transitory, computer-readable medium of claim 44, wherein the instruction configured to cause the computer to select the subset of almanac data from the binned almanac data based on the coarse location of the mobile device further comprise instructions configured to cause the computer to select the subset of almanac data based at least in part on the coarse location of the mobile device and on the positioning effectiveness criteria.

46. The non-transitory, computer-readable medium of claim 45, wherein the positioning effectiveness criteria comprise signal reliability metrics, channel identification information, or a combination of signal reliability metrics and channel identification information.

47. An apparatus for providing almanac data to a mobile device, the apparatus comprising:
a tangible, non-transitory computer-readable memory;
a transceiver configured to obtaining wireless access point data associated with a plurality of wireless access points;
a processor connected to the tangible, non-transitory computer-readable memory and configured to bin the wireless access point data based on location to generate binned almanac data, the binned almanac data comprising Media Access Control (MAC) addresses of one or more wireless access points, most recently used channel identification, and positioning effectiveness criteria.

48. The apparatus of claim 47, wherein the transceiver is configured to receive a coarse location from the mobile device, and wherein the processor is configured to select a subset of almanac data from the binned almanac data based on the coarse location of the mobile device, and wherein the transceiver is further configured to send the subset of almanac data to the mobile device.

49. The apparatus of claim 48, wherein the processor is configured to select the subset of almanac data based at least in part on the coarse location of the mobile device and on the positioning effectiveness criteria.

50. The apparatus of claim 49, wherein the positioning effectiveness criteria comprise signal reliability metrics, channel identification information, or a combination of signal reliability metrics and channel identification information.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for determining a position of a mobile device, the method comprising:
   determining a coarse location information for the mobile device;
   sending the coarse location information for the mobile device to a location server;
   receiving, from the location server, almanac data responsive to the coarse location information, the almanac data comprising Media Access Control (MAC) addresses of one or more wireless access points and a recently used channel identification;
   selecting a set of wireless access points proximate to the mobile device from the almanac data;
   measuring signals received from the set of selected wireless access points;
   determining the position of the mobile device based at least in part on the signals measured;
   identifying a subset of wireless access points from the set of wireless access points from which the mobile device was able to measure the signals;
   identifying active channels associated with the subset of wireless access points on which the subset of wireless access points were transmitting at a time that the signals were measured; and
   sending identifiers associated with the subset of wireless access points and active channels to the location server.

2. The method of claim 1, wherein the recently used channel identification comprises a channel number, a channel frequency, or a combination thereof.

3. The method of claim 1, wherein the almanac data further comprises MAC addresses and associated channel identification.

4. The method of claim 1, wherein the almanac data further comprises transceiver reliability metrics.

5. The method of claim 4, wherein the transceiver reliability metrics comprise RSSI reliability metrics.

6. The method of claim 4, wherein the transceiver reliability metrics comprise RTT reliability metrics.

7. The method of claim 1, wherein selecting the set of wireless access points proximate to the mobile device from the almanac data comprises selecting wireless access points operating on a same channel.

8. A method for determining a position of a mobile device, the method comprising:
   determining a coarse location information for the mobile device;
   sending the coarse location information for the mobile device to a location server;
   receiving, from the location server, almanac data responsive to the coarse location information, the almanac data comprising Media Access Control (MAC) addresses of one or more wireless access points and a recently used channel identification;
   selecting a set of wireless access points proximate to the mobile device from the almanac data;
   determining a power status of the mobile device indicating whether power consumption of the mobile device is currently constrained;
   performing the following responsive to the power status of the mobile device currently being unconstrained:
      performing a scan for wireless access points proximate to the mobile device;
      measuring signals received from the wireless access points detected during the scan; and determining the position of the mobile device based at least in part on the signals measured from the wireless access points detected during the scan.

9. A mobile device for determining a position of the mobile device, the mobile device comprising:
- a tangible, non-transitory computer-readable memory;
- a processor connected to the tangible, non-transitory computer-readable memory and configured to:
  - determine a coarse location information for the mobile device; and
- a transceiver configured to send the coarse location information for the mobile device to a location server and to receive, from the location server, almanac data responsive to the coarse location information, the almanac data comprising Media Access Control (MAC) addresses of one or more wireless access points and a recently used channel identification,
- the processor being further configured to select a set of wireless access points proximate to the mobile device from the almanac data,
- the transceiver being further configured to measure signals received from the set of selected wireless access points,
- the processor being further configured to:
  - determine the position of the mobile device based at least in part on the signals measured,
  - identify a subset of wireless access points from the set of wireless access points from which the mobile device was able to measure the signals,
  - identify active channels associated with the subset of wireless access points on which the subset of wireless access points were transmitting at a time that the signals received from the set of selected wireless access points were measured, and
  - send identifiers associated with the subset of wireless access points and active channels to the location server.

10. The mobile device of claim 9, wherein the recently used channel identification comprises a channel number, a channel frequency, or a combination thereof.

11. The mobile device of claim 9, wherein the almanac data further comprises MAC addresses and associated channel identification.

12. The mobile device of claim 9, wherein the almanac data further comprises transceiver reliability metrics.

13. The mobile device of claim 12, wherein the transceiver reliability metrics comprise RSSI reliability metrics.

14. The mobile device of claim 12, wherein the transceiver reliability metrics comprise RTT reliability metrics.

15. The mobile device of claim 9, wherein the processor being configured to select the set of wireless access points proximate to the mobile device from the almanac data is further configured to select wireless access points operating on a same channel.

16. A mobile device for determining a position of the mobile device, the mobile device comprising:
- a tangible, non-transitory computer-readable memory;
- a processor connected to the tangible, non-transitory computer-readable memory and configured to:
  - determine a coarse location information for the mobile device; and
- a transceiver configured to send the coarse location information for the mobile device to a location server and to receive, from the location server, almanac data responsive to the coarse location information, the almanac data comprising Media Access Control (MAC) addresses of one or more wireless access points and a recently used channel identification,
- the processor being further configured to select a set of wireless access points proximate to the mobile device from the almanac data,
- determine a power status of the mobile device and perform the following responsive to the power status of the mobile device exceeding a predetermined threshold:
  - perform a scan for wireless access points proximate to the mobile device;
  - measure signals received from the wireless access points detected during the scan; and
  - determine the position of the mobile device based at least in part on the signals measured from the wireless access points detected during the scan.

* * * * *